(12) United States Patent
Mawendra

(10) Patent No.: US 11,129,344 B2
(45) Date of Patent: Sep. 28, 2021

(54) CENTRAL PROCESSING HORTICULTURE

(71) Applicant: Aravinda Raama Mawendra, Newark, DE (US)

(72) Inventor: Aravinda Raama Mawendra, Newark, DE (US)

( * ) Notice: Subject to any disclaimer, the term of this patent is extended or adjusted under 35 U.S.C. 154(b) by 434 days.

(21) Appl. No.: 16/152,835

(22) Filed: Oct. 5, 2018

(65) Prior Publication Data
US 2019/0029200 A1 Jan. 31, 2019

Related U.S. Application Data

(63) Continuation-in-part of application No. 14/588,414, filed on Jan. 1, 2015, now Pat. No. 10,094,116.

(51) Int. Cl.
*A01G 31/04* (2006.01)
*A01G 9/24* (2006.01)

(52) U.S. Cl.
CPC .......... *A01G 31/045* (2013.01); *A01G 9/247* (2013.01)

(58) Field of Classification Search
None
See application file for complete search history.

(56) References Cited

U.S. PATENT DOCUMENTS

| | | | | |
|---|---|---|---|---|
| 3,276,163 A * | 10/1966 | Oepen | ................... | A01G 31/042 47/65 |
| 3,327,425 A * | 6/1967 | Dosedla | ............... | A01G 31/042 47/60 |
| 3,343,300 A * | 9/1967 | Englert | ................ | A01G 31/047 47/17 |
| 3,664,061 A * | 5/1972 | Oepen | .................. | A01G 31/042 47/59 R |
| 3,717,953 A * | 2/1973 | Kuhn | ..................... | A01G 18/62 47/1.1 |
| 3,771,258 A * | 11/1973 | Charney | ................ | A01G 9/143 47/65 |
| 3,824,736 A * | 7/1974 | Davis | ...................... | A01G 9/24 47/17 |

(Continued)

FOREIGN PATENT DOCUMENTS

| | | | | |
|---|---|---|---|---|
| CN | 202799834 U | * | 3/2013 | ............ A01G 31/04 |
| EP | 2489256 A2 | * | 8/2012 | ............... A01G 9/14 |

(Continued)

*Primary Examiner* — Peter M Poon
*Assistant Examiner* — Morgan T Barlow

(57) ABSTRACT

Plants are positioned in containers on a conveyor having conveyor rails. The conveyor rails pass into a radiation space above a roof of a building, along an exterior side of the building and into a processing space below the roof of the building. One or more of the conveyor rails in the radiation space may be supported by a frame. A part of the conveyor extends horizontally above the roof of the building, and another part of the conveyor extends vertically along the exterior side of the building. Water pipelines and a dispenser are provided in the processing space and not in the radiation space, the dispenser being positioned below the roof of the building. The conveyor moves the plants between the radiation space and the processing space during the plants' lives. The frame may be moved to raise or reposition the conveyer in the radiation space.

26 Claims, 16 Drawing Sheets

FIG. 8

(56) References Cited

U.S. PATENT DOCUMENTS

| | | | | |
|---|---|---|---|---|
| 4,028,847 A * | 6/1977 | Davis | A01G 31/042 | 47/65 |
| 4,068,405 A * | 1/1978 | Campbell | A01G 31/042 | 47/65 |
| 4,163,342 A * | 8/1979 | Fogg | A01G 31/04 | 47/58.1 R |
| 4,255,897 A * | 3/1981 | Ruthner | A01G 9/249 | 47/65 |
| 4,317,308 A * | 3/1982 | Derrick | A01G 18/69 | 47/1.1 |
| 4,356,664 A * | 11/1982 | Ruthner | A01G 31/042 | 47/65 |
| 5,438,794 A * | 8/1995 | Wi | A01G 9/143 | 47/17 |
| 5,511,340 A * | 4/1996 | Kertz | H01L 21/285 | 47/65 |
| 5,515,648 A * | 5/1996 | Sparkes | A01G 31/047 | 47/65 |
| 5,664,369 A * | 9/1997 | Kertz | A01H 4/001 | 47/65 |
| 6,122,861 A * | 9/2000 | Kertz | A01G 31/04 | 47/65 |
| 6,508,033 B2 * | 1/2003 | Hessel | A01B 79/005 | 47/60 |
| 7,334,368 B1 * | 2/2008 | Ahm | A01C 1/02 | 47/61 |
| 8,151,518 B2 * | 4/2012 | Adams | A01G 31/06 | 47/82 |
| 8,234,814 B2 * | 8/2012 | Kertz | A01G 9/024 | 47/67 |
| 8,453,380 B1 * | 6/2013 | Helder | B65G 17/20 | 47/67 |
| 8,533,993 B2 * | 9/2013 | Pettibone | A01G 31/042 | 47/65 |
| 8,614,088 B2 * | 12/2013 | Dujardin | A01G 7/00 | 435/285.1 |
| 9,307,703 B2 * | 4/2016 | Berghoff | A01G 7/04 | |
| 9,854,750 B2 * | 1/2018 | Brusatore | A01G 31/06 | |
| 2005/0258015 A1 * | 11/2005 | Kinzer | B65G 69/0408 | 198/300 |
| 2005/0268547 A1 * | 12/2005 | Uchiyama | A01G 9/249 | 47/64 |
| 2009/0133339 A1 * | 5/2009 | Carolan | E04D 7/00 | 52/173.1 |
| 2009/0260282 A1 * | 10/2009 | Hashimoto | A01G 9/045 | 47/20.1 |
| 2009/0307973 A1 * | 12/2009 | Adams | A01G 31/06 | 47/62 C |
| 2010/0269407 A1 * | 10/2010 | Prohaska | A01G 9/00 | 47/65 |
| 2011/0120002 A1 * | 5/2011 | Pettibone | A01G 31/042 | 47/65 |
| 2011/0130871 A1 * | 6/2011 | Lin | A01G 9/022 | 700/219 |
| 2011/0131876 A1 * | 6/2011 | Pettibone | A01G 31/042 | 47/65 |
| 2011/0252705 A1 * | 10/2011 | Van Gemert | A01G 9/249 | 47/66.7 |
| 2012/0124907 A1 * | 5/2012 | Daas | A01G 9/088 | 47/86 |
| 2012/0279122 A1 * | 11/2012 | Benne | A01G 31/045 | 47/60 |
| 2012/0324788 A1 * | 12/2012 | Sakura | A01G 31/04 | 47/66.6 |
| 2013/0104452 A1 * | 5/2013 | Hassle | A01G 31/042 | 47/17 |
| 2013/0104453 A1 * | 5/2013 | Hassle | A01C 1/02 | 47/17 |
| 2014/0165468 A1 * | 6/2014 | Roeser | A01G 9/12 | 47/62 R |
| 2015/0000191 A1 * | 1/2015 | Nagadome | A01G 7/00 | 47/66.6 |
| 2015/0000194 A1 * | 1/2015 | Meerman | A01G 31/04 | 47/62 R |
| 2015/0014440 A1 * | 1/2015 | Nagadome | A01G 25/02 | 239/289 |
| 2015/0082695 A1 * | 3/2015 | Rodel | B26D 5/007 | 47/58.1 FV |
| 2015/0173315 A1 * | 6/2015 | Aznar Vidal | A01G 31/02 | 47/62 R |
| 2015/0250115 A1 * | 9/2015 | Pickell | A01G 31/042 | 47/62 R |
| 2016/0165810 A1 * | 6/2016 | Johansson | A01G 9/249 | 47/65 |
| 2016/0302369 A1 * | 10/2016 | Pickell | A01G 31/045 | |
| 2017/0142912 A1 * | 5/2017 | Gasmer | A01G 9/249 | |
| 2017/0208760 A1 * | 7/2017 | Lodge | A01G 22/00 | |
| 2018/0288949 A1 * | 10/2018 | Glaser | A01G 24/25 | |
| 2018/0359972 A1 * | 12/2018 | Millar | A01G 31/06 | |
| 2019/0380284 A1 * | 12/2019 | Kee | A01G 9/246 | |
| 2020/0100445 A1 * | 4/2020 | Saba | A01M 7/0089 | |

FOREIGN PATENT DOCUMENTS

| | | | | |
|---|---|---|---|---|
| GB | 2077082 A * | 12/1981 | | A01G 31/045 |
| GB | 2550186 A * | 11/2017 | | A01G 31/042 |
| JP | 10215701 A * | 8/1998 | | A01G 31/045 |
| KR | 20160015888 A * | 2/2016 | | A01G 31/045 |
| WO | WO-2010008335 A1 * | 1/2010 | | A01G 31/042 |
| WO | WO-2016190017 A1 * | 12/2016 | | A01G 7/00 |
| WO | WO-2017137976 A1 * | 8/2017 | | A01G 31/047 |
| WO | WO-2018016609 A1 * | 1/2018 | | A01G 9/00 |
| WO | WO-2018175794 A1 * | 9/2018 | | A01G 31/06 |

* cited by examiner

CENTRAL PROCESSING HORTICULTURE

CROSS-REFERENCE TO RELATED APPLICATIONS

This application is a Continuation-in-Part of prior U.S. patent application Ser. No. 14/588,414, filed Jan. 1, 2015, whose entire disclosure is hereby incorporated by reference.

FIELD OF THE INVENTION

This application is a centralized method and system of horticulture. It is an aid for automation and administration of cultivating plants such as in farm, lawn, roof garden, etc.

Terms Used in this Specification

Plant: Any agricultural plant (living organism) which are grown for grains, fruits, vegetables, recreation, drug, etc. or used as ornaments or for aesthetic purposes. The plant can be of any maturation stage from seed to harvest stage. It can be annual or perennial.

Plant processes: This term is used to mean the processes conducted on the plants, plant-containers & the produce typically done by human or machine. It includes operations such as seeding, planting, re-planting, feeding, draining, applying pesticide, monitoring, inspecting, testing, cutting/pruning, harvesting, preparing/starting new cycle of plants, etc.

Repetitive plant processes: The plant processes that need to be conducted more than once during the life time of a plant such as watering, nutrient administration, pruning, pesticide administration, harvesting (for plants as vegetables), etc.

Resources: The men, machines and their controls that directly or indirectly execute the above-defined plant processes.

Farm & Farm space: The terms 'farm', 'lawn', 'nursery' etc., are equivalent and they all mean the 3-dimentional space where the plants are grown, the plant processes conducted and the—plants harvested.

Radiation space: The 3-dimensional space where the plants receive sunlight or artificial radiation. Greenhouse is a radiation space substantially enclosed.

Processing space: The 3-dimensional space where plant processes (as defined above) are conducted.

Atmospheric-barrier: Any construction, enclosure or device that acts as a barrier between the atmospheres of two spaces. The atmospheric-barrier reduces the mixing of the two atmospheric airs and/or shields one from radiation significantly. It further aids improved atmospheric conditions such as temperature, humidity, air-composition, air cleanliness/pollution, etc. in the space covered by the enclosure it is fitted on. Air-door/air-curtain, or weather-strips (usually plastic or rubber strips hanging vertically down in the passage) etc. can enhance atmospheric-barrier function.

BACKGROUND

The Issues/Requirements

Most of the farm mechanization & automation attempts tried so far have been with the approach of moving the resources to each location of the plants for every process to be executed. This is tedious and time-consuming work for humans. Even if machines are to do this work, it calls for very high degree of sophistication. The alternate approach is to position the resources all over the farm space wherever the plants are growing. This results in multiple installations of resources. For example, multiple water sprinklers/dispensers are setup to span the land area on a farm/lawn. This approach is cost prohibitive. Thus, both approaches have their drawbacks.

Throughout the world, more and more people want to live in urban areas. According to a study of demographic trends, by the year 2050, about 80% of the world's population will reside in urban areas and the world human population will increase by about 3 billion people. 20% more farming land would be required to feed the people. Most countries in the world will not have the extra land to increase the cultivation. Hence, effective land utilization should be the top priority in the farming methods and it should start from now. Building multistoried greenhouses or vertical farming only adds to more difficulties for the movement of resources and the plant processing and hence are not viable solutions.

Today's world is facing several competing requirements with regard to farming. While we want to make our world 'green', eat organic, nutritious foods, reduce atmospheric/noise pollution, reduce the cost of farm produce, etc. We expect wide variety of foods and available conveniently close to our homes. Further, we look to reduce our home energy consumption, reduce the cost of travel (to get the vegetables), etc. There is not an easy farming method to meet all these requirements.

The large-scale farms are setup only in rural areas due to the large land required and the low land cost. It adds to the transport costs on the farm produce for city dwelling people. Further, the transits into and out of cities add to the fossil-fuel usage and the air-pollution. Urban dwellers are unable to get fresh produce because of the delay in delivery. The biotechnological counter measures to increase the plants' shelf life & transit resistance often result in the plant strains with altered/less preferred flavor and texture of the produce. Hence, there is a strong need for farming in the cities, if possible close to every neighborhood.

According to a report, the lawn mowers in U.S. consume 1.2 billion gallons of gasoline annually. As regards lawns, there has not been an easy automation solution available for maintaining lawns. The watering, mowing, administering nutrients, etc. are done by manual labor. Gasoline-powered lawn mowers are predominantly used in spite of the associated expense and air & noise pollution. If there exists an electrically powered automated system for the maintenance of lawn, people would use such system rather than the current manual, gasoline-dependent, approach.

Prior Arts

There is no commonly viable solution available in the searches made to address all the issues/requirements stated above.

The conveyor plant method proposed in U.S. Pat. No. 8,533,993 entitled "Modular Vertical Farm Cell" provides automation using a vertical conveyor system. This system is designed to hold only one type of plant. The plants on the conveyor system according to this prior art move just one full loop on the conveyor path for its entirety of life. The plant has a definite position in the conveyor path for each stage of its maturity. For example, if the plantlets were planted at the bottom row of the path of the conveyor, the half-matured plants would be at the top row of the conveyor. The fully matured plants will be back at the bottom row again. However, the plants need water and nutrition at all stages of growth. Hence, several water/nutrient feeding resources will have to be positioned all through the conveyor path. Similarly, other plant processes such as pruning, inspections, pesticide-applications have to be carried out all through the conveyor path and their corresponding machines have to be installed in multiple places. We address this as a distributed processing. If we want to automate all these plant processes using robotic machines, we have to setup machines, run cables, pipes, power supplies all over the farming area. More importantly, we have to install duplicate machines of the same type in various locations of the conveyor thus increasing our investments several folds.

Further, the prior art claims that the whole framework (of conveyor setup) is covered by an enclosure to make it a greenhouse. Thus, since the resources are distributed all through the conveyor path, this design forces the resources to be exposed to same weather conditions as the plants. For example, there is no scope for providing air-conditioning for the resources (say a human pruning the plants) if we want to. Further, because the green house holds both the plants and the resources, it needs to be built accordingly big enough to accommodate all of them.

The scheme of this prior art is rigidly tied to one plant type with one life duration. To elaborate further, the specification of U.S. Pat. No. 8,533,993, quotes an example of 182 days of life of the plant sugarcane, where the harvesting is done on $182^{nd}$ day, as the conveyor moves at an (indexed) speed of 182 days per path's loop. The conveyor is designed to hold 182 plants each in progressive stages of maturity on the conveyor. Once this design is implemented and the plants are on various positions of the conveyor, the speed of the conveyor cannot be altered, because if we do, the life cycle for the plants will be impacted. All the resources will have to be re-positioned to different locations in order to meet the new conveyor position for the various stages of the plant. For example, if we want to grow a different type of sugarcane that matures in say 170 days (instead of 182 days), we cannot plant this new plant in the conveyor and change the conveyor cycle time from 182 days to 170 days. If we do, the plants already on the conveyor will reach the end of cycle sooner than its maturity stage. Thus, every time (if at all) we want to start using a different plant or different plant grade, we will need to harvest a set of plants in immature stage or discard them or wait 182 days for the conveyor to get empty before we start the new plant cycle. Even then, it would be a time/resource consuming major reset of the positions of the resources.

For the same above reason, in the prior art's scheme, multiple types of plants cannot be farmed at the same time. For example, one cannot grow say, 50 tomato plants, 50 beans, 20 lettuce and 40 carrot plants, all in one conveyor at the same time, because each require different cycle duration. However, such multi-plant farming is exactly what is desirable to have in a medium/small farm, especially a city dwelling person.

Another prior art, Chinese Patent No. CN103945687 entitled "Method and arrangement for growing plants" describes a vertical greenhouse building, where the life of the plants start at the lowest level of the building. The seeds are sowed there and the germinated plantlets with the plants-containers (addressed as pots in this prior art) are transferred to trays which are moved to the top of the building using an elevator. From there, the plant comes down the conveyor system (addressed as tracks in this prior art) moving the plants down to the bottom of the building through the vertical greenhouse to allow the germinated seeds to grow into plants by the time they reach the bottom. The harvesting is done at the bottom of the green house.

Thus, most part of the plant life is spent in one quick upward travel and followed by one slow downward travel by the plant. This conveyor approach is similar to the one in the previous prior art U.S. Pat. No. 8,533,993-B2 in that the plants make only one cycle of travel on the conveyor path in their whole life. As this prior art further explains, the watering and administration of nutrients are done throughout the conveyor path at specified pitch gaps along the tracks. Thus, the design is also similar, in that it is a distributed processing. Thus the disadvantages mentioned for the prior art U.S. Pat. No. 8,533,993-B2 are applicable to this as well.

Apart from above-stated shortcomings, both above prior arts, namely U.S. Pat. No. 8,533,993 and Chinese Patent No. CN103945687 are for large-scale farming. They do not address the requirements of small farmers and ordinary household urban citizens' backyard or roof farming.

Another prior art of U.S. Pat. No. 6,508,033, entitled "Self-contained fully automated robotic crop production facility", divides the farm space into multiple zones such as seed, nursery and main growing area. This prior art employs automation using robotic arms rather than conveyors. The plants are moved by the robotic arm and positioned to its appropriate zone depending on its maturation stage. The robotic arm performs the processes of seeding, planting and harvesting. As design-engineers are aware, the range of movement of any robotic arm is limited as compared to a conveyor, due to limits on size and physical strength of structures.

Further, the design shows the robot's base (marked as reference numeral 16 of FIG. 2 in U.S. Pat. No. 6,508,033) carrying the robotic arm from zone to zone. Hence, this is a classic example of moving the resource to various zones of the farm (and plant to plant), an issue we mentioned at the start of the discussion on the background, which we want to avoid. It leads to complex mechanical, electric and electronic designs and maintenance apart from huge investment cost. In spite of such design, in this prior art, the key day-to-day processing resources such as watering, nutrient-feeding resources, etc. are distributed over all the farm space. Hence, in this prior art, the resources are distributed as well. Thus, by having distributed as well as moving resources with limitations on the robotic arm lengths, this farm design has more issues than what was mentioned for the previous prior arts discussed.

Similar to previous example prior arts, the greenhouses have to be built big to accommodate the resources directly increasing the farm investment cost.

BRIEF SUMMARY OF THE INVENTION

Goals

In order to appreciate the current application the goals are submitted in brief:
The design of new farm should:
a) Minimize land usage. Allow roof-farming, vertical farming, etc. Minimize conveyor structure load.
b) Be scalable. Adaptable for all size of farms. Allow multiple types of plants at the same time.
c) Aid total automation, including day-to-day watering.
d) Minimize resources movement.
e) Avoid duplicate resources. Maximize resource comfort & convenience, resource efficiency. Minimize resource maintenance cost, minimize the sophistication requirement on resources, minimize greenhouse sizes.
f) Adapt newer farming technologies like hydroponics, aquaponics, etc.

g) Improve efficiency of farm administration.

From the perspective of the society, the new design should:
a) Reduce fossil fuel consumption.
b) Minimize travel for consumers; minimize transit of vegetables.
c) Reduce energy costs of home, buildings.
d) Improve quality of farm produce.
e) Contribute to 'green' products and green society.

During the life cycle of the plant, various plant processes are executed. Depending on the plant, its type, the location, the season, the ingredients at our disposal, etc., the number of executions of such processes would differ. Let us say, a set of plants lives for 100 days from seed stage until final harvest. During this period, they may go through watering process 95 times, nutrient application 10 times, pruning 4 times and harvesting 5 times. The seeding, the plantlet planting and the final harvesting are executed each once, adding another 3 executions of the processes. Hence, out of the above 117 executions of plant processes, majority of them 114 are repetitive plant processes.

The success of farm mechanization and the automation depends on the ease with which we execute the repetitive plant processes. In the given example numbers, if we could make an improvement even in just the two processes, say, the watering and the nutrient application, we would have eased 92% of our work. Hence, the approach of this application is to address the repetitive plant processes and at the same time keeping it extensible to non-repetitive processes.

The current application comprises of at least the following key elements:
(a) The resource to execute the plant process;
(b) A conveyor holding the set of plants on its conveying path;
(c) The conveyor's path and the location of the resource are so designed that a portion of the path passes close to the resource in order for the resource to execute the process on those plant(s) on the conveyor that are nearest to the resource.
(d) The conveyor is operated and controlled so that all the plants are carried along the path to pass close to the resource sequentially and the resource executes the process on all of them sequentially. This completes one execution of the process for all the plants.
(e) Above step (d) is repeated every time the plants need the process to be executed, thus making all plants go to the same resource for the execution of the same process. For example, if watering is needed every day, the resource would be water-dispenser and the conveyor is operated every day to pass all plants close to the water-dispenser every day. Similarly, every time the plants need nutrients, pruning or any such repetitive process, the conveyor is controlled so that the plants move close to the appropriate resource and the resource executes that process.

For the purposes of implementing this application, it does not matter if the plants are loaded on and off the conveyor every day or permanently held on the conveyor. However, it could be advantageous to keep all the plants on the conveyor all through their life, because loading/unloading of plants on the conveyor consumes more resources and energy. Similarly, it does not matter how far apart the resources are kept among themselves in the farm space. Nevertheless, it is advantageous to keep all the resources together, occupying contiguous spaces within a processing space of as minimum size as possible to gain the advantages of central processing. The key is that the plants move to a central resource for getting the process done and they repeat that movement through the path every time the same process needs to be performed.

The farmer may choose to automate only a few of the repetitive processes and not others. Since watering and nutrient administration are essential for all plant types, we assume that that would be included by every farm for automation. Further, it is advantageous to enclose such grouped resources and add atmospheric-barriers to keep the resources in good condition.

For the above reasons, throughout this specification in the example embodiments, mostly only the water & nutrient dispenser are shown as the resource. Further, they are shown with centrally grouped and enclosed resources with additional atmospheric-barriers where appropriate.

The repeated movement of plants and the non-movement of the resources provide the novelties of the current application since it is counter-intuitive, for example, to think of moving the plants towards water supply (everyday) rather than installing water hoses/sprinklers at the location of the plant.

However, the said novelties have resulted in advantageous aspects in current application over prior as listed in the below table, which will be further corroborated in later sections:

| Aspect of the disclosure | Prior Arts | Current Invention |
|---|---|---|
| Plants move. Resources are static. | Yes in some | Yes |
| Repetitive Plant Processes are done by repeated-movement of the plants to the same resource. | No | Yes |
| Separation of radiation & processing spaces possible? | Yes in Some | Yes. Made easy. |
| Centralization of processes possible? | No | Yes. Made easy. |
| Centralization of resources possible? | No | Yes. Made easy. |
| Duplicate resources can be avoided? | No | Yes. |
| Multiple types of plants on the same conveyor possible? | No | Yes. |

BRIEF DESCRIPTION OF THE DRAWINGS

Figures

All figures are schematic and do not represent the product's actual shape, size or proportions.

REFERENCE NUMERALS IN THE DRAWINGS

Figure 1:
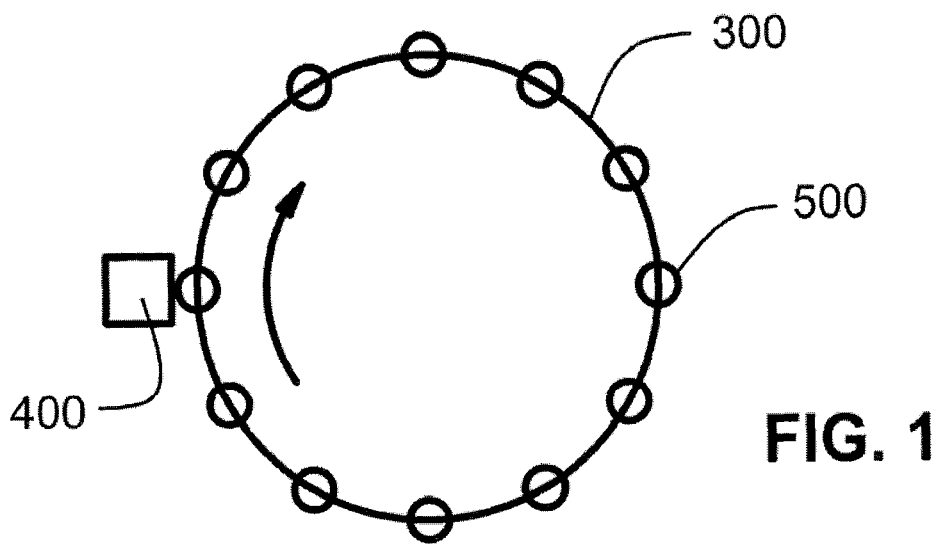
FIG. 1 is the line diagram of an implementation of the present application.

Same Reference Numeral is always used to describe the same element in all the Figures.

| Numeral | FIG. No. where it appears | Description |
| --- | --- | --- |
| 100 | Many | Radiation space |
| 200 | Many | Processing space |
| 210 | 24 | Second Processing space |
| 300 | Many | Conveyor Path/Rail |
| 310 | Many | Frame holding the Conveyor rails 300 |
| 314 | 19-22, 20A, 22A | Sliding Member of the frame 310, sliding on the pillar 320 |
| 320 | 19-22, 20A, 22A | Pillar supporting the frame holding the conveyor rails 300 |
| 332 | 20A | Rack (gear) |
| 334 | 20A | Pinion (gear) |
| 336 | 22A | Worm wheel (gear) |
| 338 | 22A | Worm (gear) |
| 400 | 3-5 | Resources (generic) |
| 500 | Many | Plant-Container |
| 22 | 9, 11, 13, 16 | Opening for conveyor (location of air-door/air-curtain) |
| 42 | Many | Water/Nutrient administrator |
| 44 | 16 | Grass-cutter |
| 46 | 7, 8, 26 | Shield |
| 48 | 28 | Clippings conveyor/discharger |
| 52 | 18 | Plant-Container Drain unit |
| 54 | 18 | Water/Nutrient feeding pipe line |
| 56 | 18 | Water Drain pipe line |
| 60 | 18 | Fish Tank |
| 72 | 14 | Artificial Radiation Lamp |
| GL | 13, 14 | Ground Level |
| CL | 19-22 | Center Line (axis) |
| 600 | Many | Structure/building whose space above roof is used as Radiation space 100 |
| 610 | 23-25, 27 & 28 | Another structure at a distance from the first structure 600 |

DETAILED DESCRIPTION OF THE INVENTION

FIG. 1 shows the line diagram of the plant-cultivation system according to current application. A resource 400, such as human or machine is positioned to execute the plant process. A conveyor with its path 300 is designed to pass close to the resource 400. The plant-containers with the plants represented by 500 are held on the conveyor.

When it is time to do the plant process on the plants, the conveyor is operated so that each plant container 500 is positioned close to the resource 400 one after the other. The resource 400 executes the plant processes sequentially and the cycle is completed when all plants undergo the plant process. The whole cycle is repeated every time that plant processes needs to be executed, thus aiding central processing of repetitive plant process.

The repetitive process could be the daily watering, administration of nutrients, pruning, inspecting, harvesting, etc. as applicable based on the time of the day, age of the plant, etc. Depending on the plant process to be executed, the appropriate resource 400 is positioned close to the path 300. The plant-containers 500 could be on a continuous move on the conveyor path 300 when they undergo the processing at the resource 400. Alternatively, the plant containers 500 could have an indexed motion produced by Geneva mechanisms, electronically controlled stepper motors or the like by which the plant-containers 500 stop at the resource 400 until the process is completed and move again automatically. In any case, their duration of stay of each plant-container 500 at the proximity of resource 400 would be only for the time it takes the plant process to complete in one plant-container.

Figure 2:
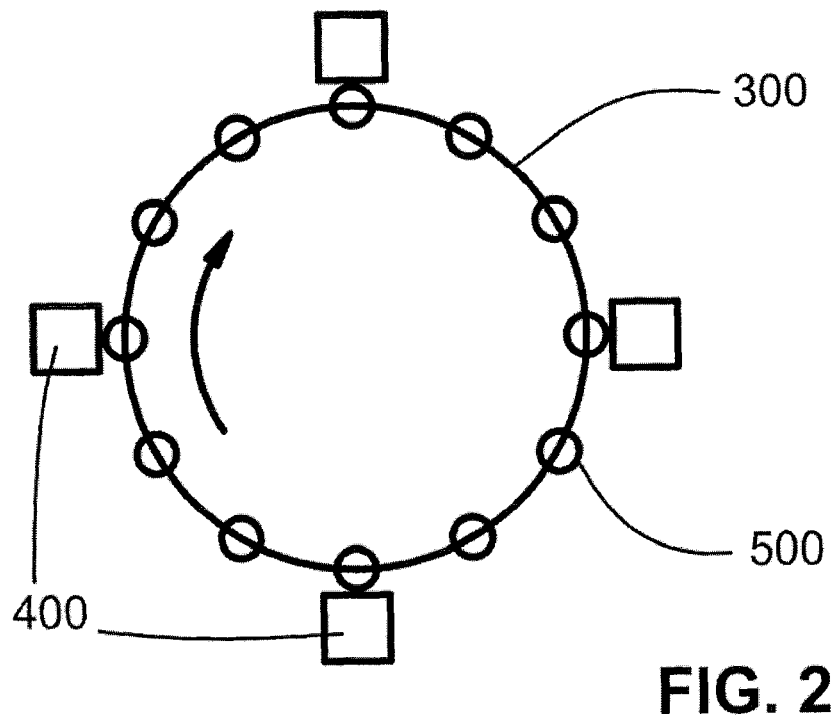
FIG. 2 is the line diagram of one implementation of the present application, as applied to multiple repetitive processes, with distributed resources.

Typically, in a farm, there would be multiple plant processes executed for each plant and each such processes would be done by a dedicated resource. FIG. 2 shows an extended implementation of the invention for multiple plant processes, using multiple resources 400 positioned in close proximity to the conveyor path 300. In FIG. 2, the resources 400 are shown distributed at different locations around the path 300.

Figure 3:
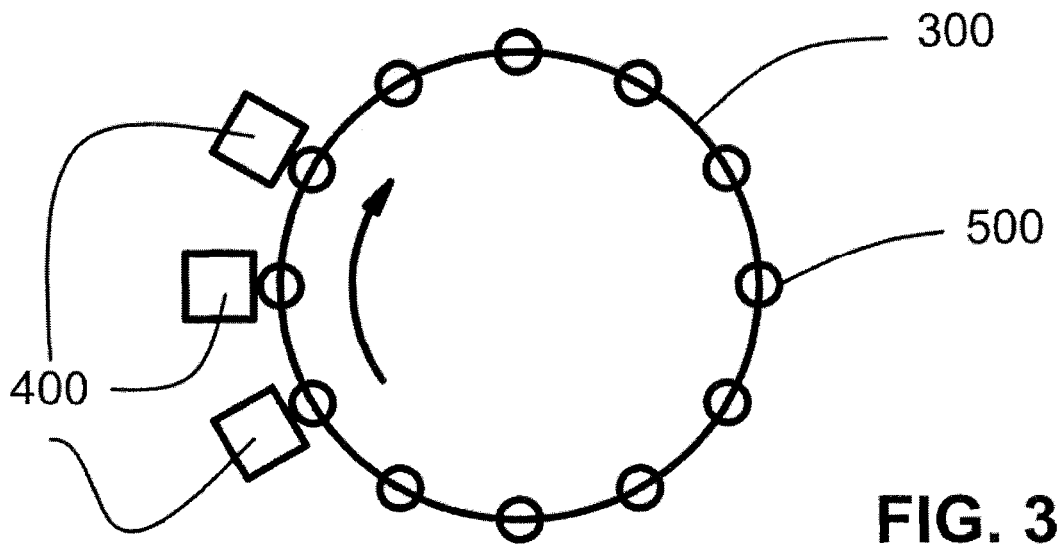
FIG. 3 is the line diagram of one implementation of the present application as applied with grouped resources.

FIG. 3 shows the alternative and preferable scheme where the resources could be grouped so that they are spatially contiguous to each other. Such grouping helps easier administration of the resources 400.

Figure 4:
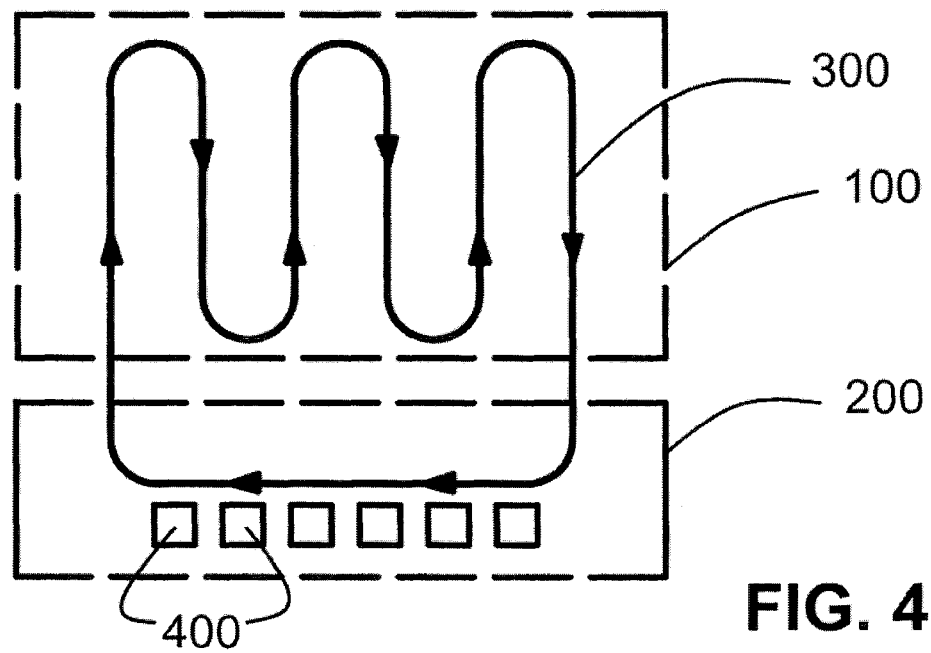
FIG. 4 is the line diagram of an implementation with separation of processing space and radiation space.

FIG. 4 elaborates such advantage of grouping the resources 400. It shows how the processing space 200 is separated from the radiation space 100 by routing the path 300 and grouping the resources 400 spatially contiguous. Such separation helps central administration. Further, by enclosing one or both spaces 100 & 200, we can provide controlled & conducive atmosphere for the resources 400 as well as the plants in the radiation space 100. This results in efficient and smaller enclosures. For example, if the radiation space 100 is a greenhouse, then the greenhouse would be of the minimum size, since it does not have to enclose the resources.

Yet another option could be that the processing space 200 be sub-divided into different temperature/humidity zones. In any case, since the plants stay in the processing space 200 for much shorter time compared to their stay in the radiation space 100, the momentary change in climate for the plants' passage in the processing space 200 would not affect the plants.

While the processing space 200 has all the activities, the radiation space 100 has very few activities. Other than the radiation process and the conveyor movement, we can have planned pollination using insects, plant monitoring under radiation, etc. in the radiation space. All other tasks are performed at the central processing space 200. However, radiation space 100 would be the place where the plants spend most time and consume most space of the farm. Hence, in practice, the central processing space 200 could be several orders smaller than the radiation space 100.

In FIG. 1, FIG. 2, FIG. 3 and FIG. 4, the path 300 of the conveyor is shown to be a closed loop. However, the requirement of the current application is the ability to move the plants close to the resources at will, but not necessarily using a closed loop of path. Hence, open paths with T-branches or blind ends can serve the purpose as well.

Figure 5:
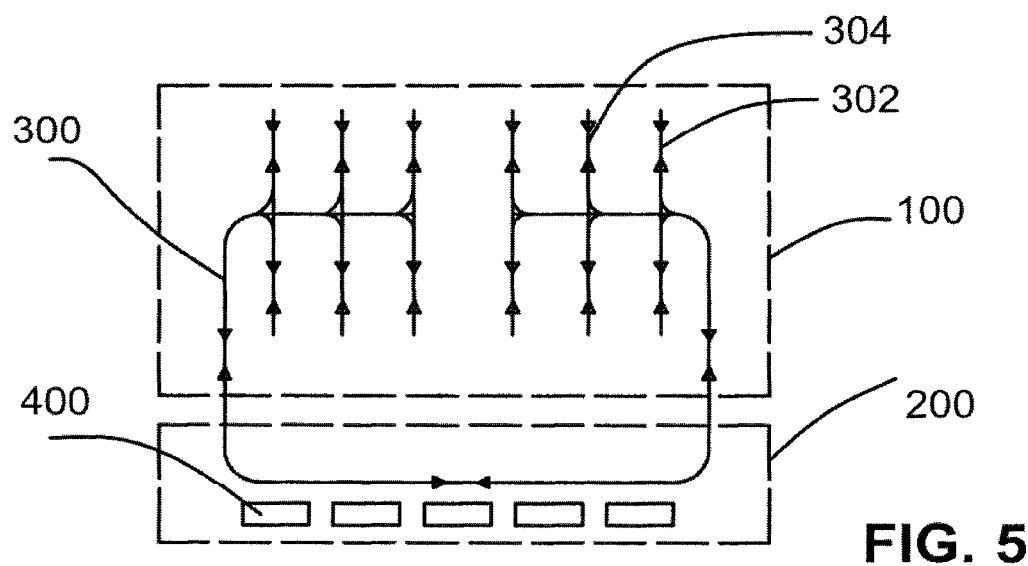
FIG. 5 shows a line diagram of an implementation with open-ended conveyor paths.

FIG. 5 shows such scheme with open-ended conveyor path 300 as stated above. It has several branches/limbs of the path 300, such as 302 and 304, which have blind ends. Each such limb with blind end may have a separate plant type and may receive differentiated radiation if necessary at the radiation space 100. Similarly, each such set of plants may be brought in to the processing space 200 at different times following different conveyor control plans. The key step according to the current application is that the plants come to a central resource 400 for plant processing.

Figure 6:
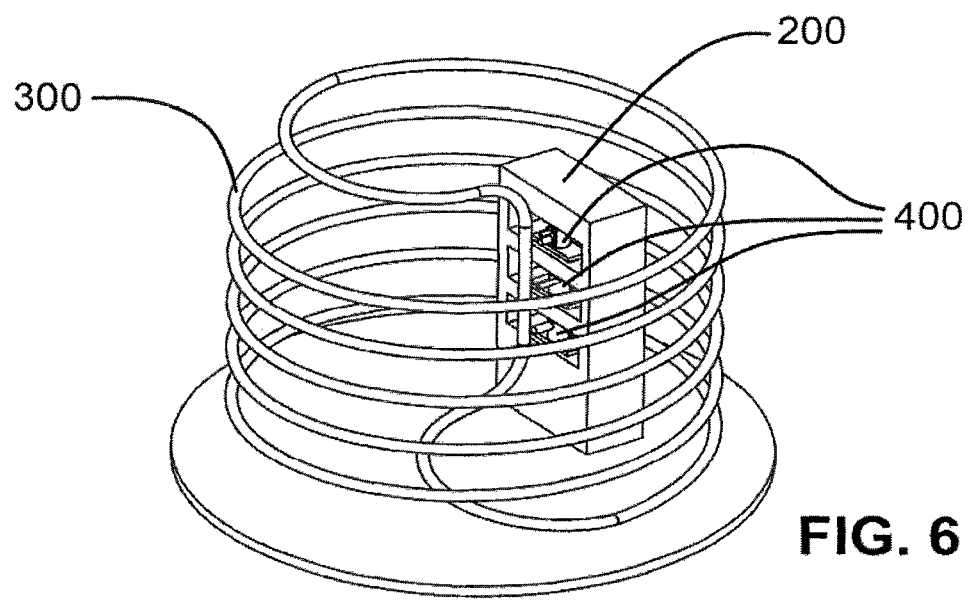
FIG. 6 shows a scheme of an implementation applied to a vertical farming with a helical path of conveyor and resources grouped at the inside of the structure.

FIG. 6 shows yet another example scheme of how the conveyor path 300 and the grouping of the resources 400 may be designed, especially in a 3-dimensional space. The FIG. 6 shows a helical, predominantly vertical path 300 of the conveyor whose loop goes from top to bottom in close proximity to a set of resources 400 inside of the helix. The plants would stay at the helix portion of the path 300 for normal radiation and when it is time for watering, nutrient-administration, etc the conveyor would be operated and the plants move sequentially through the middle limb of the path 300, close to the resources 400. They will repeat the movement every time the plant process needs to be executed. The grouped resources could be in a processing space 200, which can be in a controlled atmosphere conducive for the resources 400. This scheme would be applicable for vertical farming on a building structure. When the helix surrounds the building (building not shown in FIG), it helps save the energy costs of the building by blocking the radiation falling on the building. The scheme can be used for aesthetic-purpose wall-gardens as well.

Thus, the same concept of the application, namely, repeated moving of the plants close to the resource for repeated execution of the plant processes, can be effected in numerous schemes of the conveyor path and resource positions.

It is humbly submitted that, to the best of efforts, the author could not find any prior art where the elements of the current application are incorporated under one scope. Especially, keeping the plants on the conveyor and moving them proximate to the resource for central processing and repeating such movement for repeated execution. The unexpected & beneficial results are further shown in several embodiments as below.

DESCRIPTION OF THE EMBODIMENTS AND DRAWINGS

Home Roof Farming System

Figure 7:
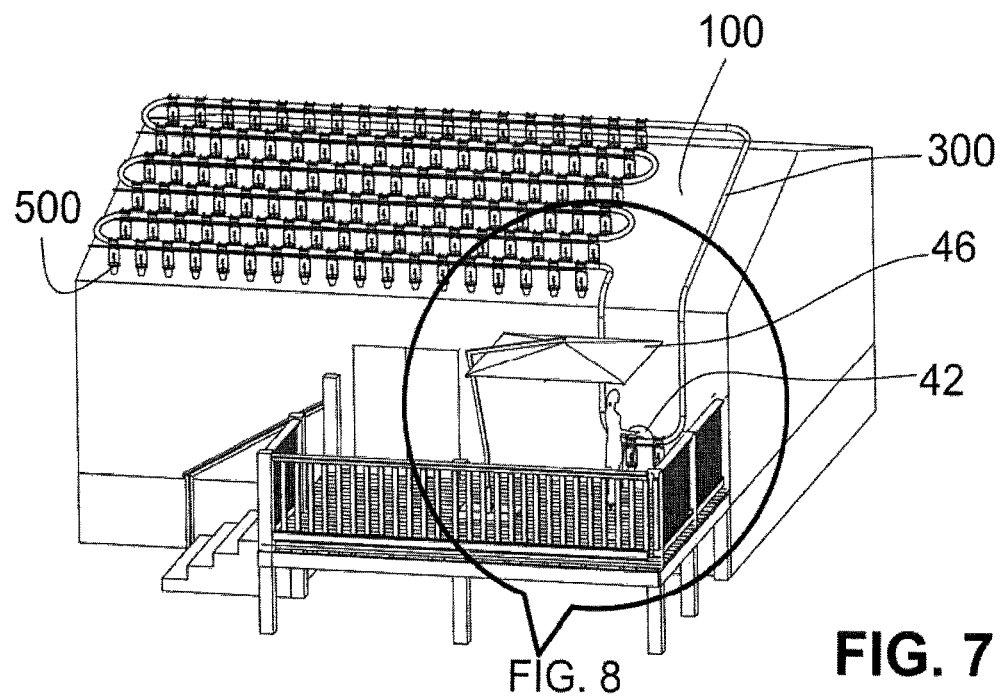
FIG. 7 & FIG. 8 show two views of a Home Roof Farming System.
Figure 8:
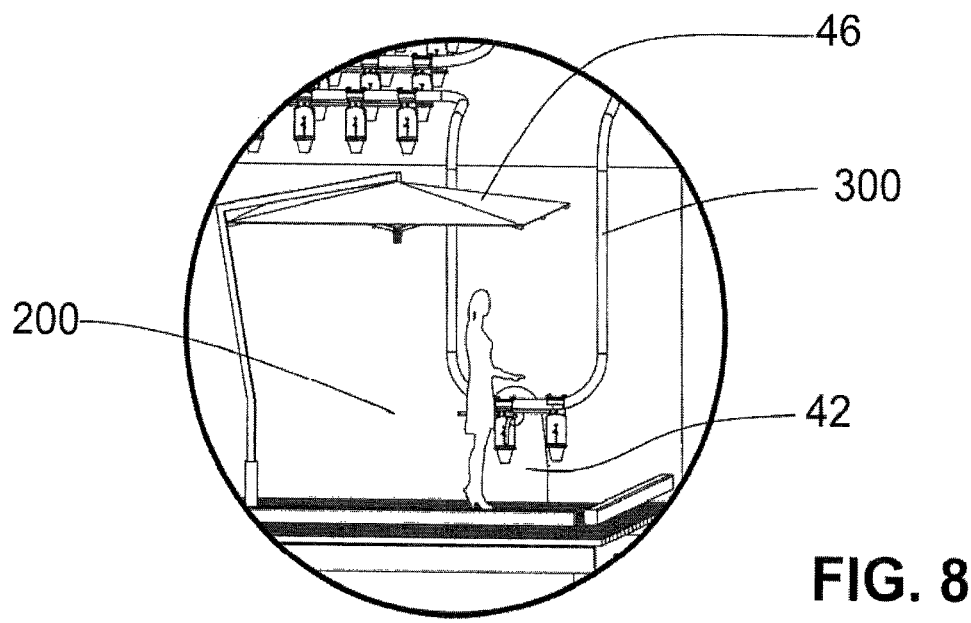

FIG. 7 and FIG. 8 show the views of an embodiment of the current application, namely, a Home Roof Farming System. The FIG. 8 is a zoomed-in view of a portion of FIG. 7. The scheme shows an example resource, an automated water & nutrient dispenser 42, better visible in the FIG. 4, positioned at a user-convenient space on the deck. FIG. 8 is shown with part of the deck railings clipped from the view for better visibility of the elements of interest. A conveyor system (not shown) is installed with a conveying path 300 spanning on top of the roof space 100, and that continues to traverse to the deck space close to the resource 42 and loops back to the roof space 100. The conveyor holds the plant-containers 500 with the plants all through the duration of the usable plants' life. The embodiment shows the space 100 on top of the roof of a house used for radiation of the plants and the deck space as a processing space.

The operation of the scheme is as below:

At the start of the plant's life cycle, the conveyor would be operated to move the plant-containers at slow pace through the deck, for the seeding operation performed one by one on each plant-container. Alternatively, the pots could be bought pre-seeded or pre-planted for further cultivation.

Once seeded/planted, plant-containers are kept at on the roof space, which is the radiation space 100. They are brought to the deck as and when watering, nutrient administration are to be executed and taken back to the radiation space 100, by the touch of a button in the conveyor control-panel (not shown). If the total number of plants are too few, simple manual cranking of the conveyor could be sufficient. The user is free to apply the desired sophistication. When it is time for the harvest the plants are brought again to the processing space 200 and the harvesting done there.

Keeping the watering & nutrient resource at the deck obviates the laying of any water pipe lines on the roof space 100. For an ordinary home farmer, she/he does not need to climb up the roof nor employ any resources on the roof for plant maintenance. Since it would be easy to setup this automation, once seeded, she/he can simply watch the automatic feeding of the plants, their growth, and finally enjoy the harvest.

If needed, she/he has the option to cover the deck with an umbrella 46, a Sunroom, 4-season room, etc. with appropriate opening(s) to let the plants go in and out. Similarly, if desired, she/he can add an enclosure with transparent panels on top of the roof space 100 to make it a greenhouse, again, with opening(s) to let the conveyor path pass through the enclosure. Possibility of such opening arrangement in an enclosure is shown in other embodiments that follow.

Further, if required, she/he can add more machines at the deck space, for mechanizing/automating more plant processes such as seeding, pruning, electronic image controlled harvesting, etc. All such machines can be of minimal sophistication as they need to process only one plant at a time and the machines themselves would be static, not reaching for the plants all over the farm space. Further, she/he needs to invest only on one machine of each kind, each of which can electronically sense the container/plant and feed the right quantity of water/nutrients. Thus, it is easy to grow & harvest multiple types of plants in the same conveyor.

Apart from saving land space, this scheme saves energy for the house by covering the roof. The owner avoids traveling to buy vegetables and can even sell the produce to her/his neighbors. Thus, the separation of processing space from radiation space and grouping of plant processes gives rise to all these beneficial options. A more elaborate list of advantages are listed in a separate section.

Generic Roof Farming

Figure 9:
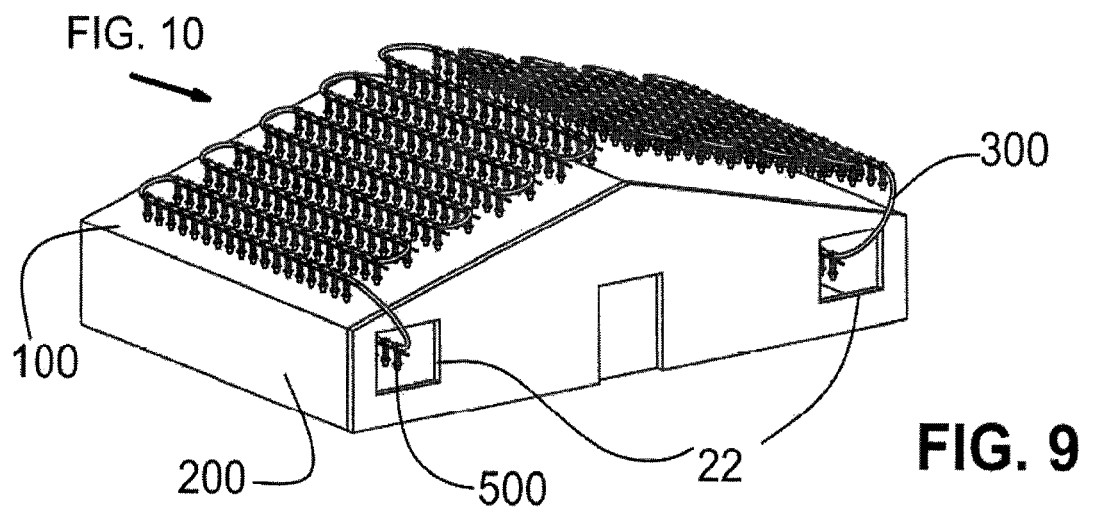
FIG. 9 & FIG. 10 show two views of a Generic Roof Farming System.
Figure 10:
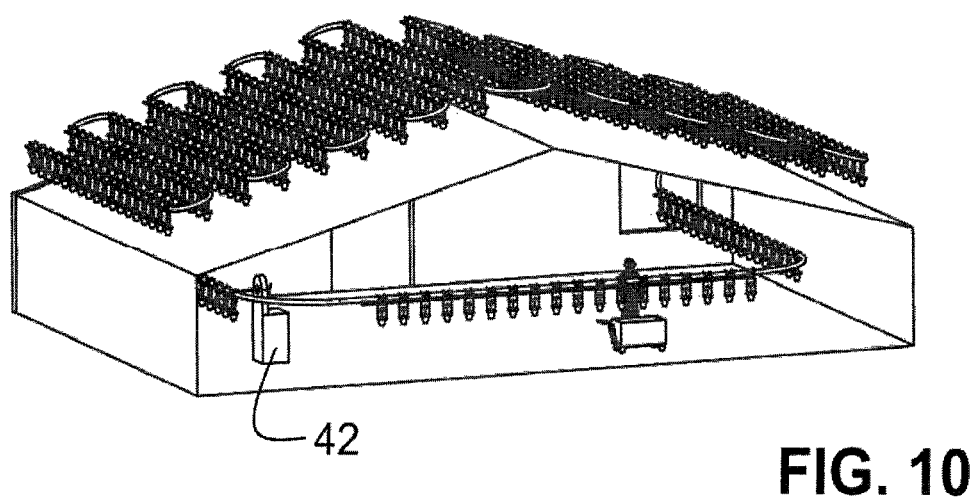

FIG. 9 & FIG. 10 schematically show the two views of a Generic Roof Farming scheme, typically for a large-scale rather than a Home Roof-Farming. It shows the plants-containers mounted on to the railings 300, passing through a radiation space 100 on top of the roof of a building and further passing through the building space 200 for central plant processes. The building in FIG. 10 is a rear view of the FIG. 9, but shown partially transparent to show the inner details.

The openings 22 in the building enclosure is where the conveyor path 300 lets the plant-containers 500 with the plants in and out of the processing space 200. It is possible to add an optional air-door/air-curtain or weather-strips in those openings 22 (device not shown). An automated water/nutrient dispenser 42 is shown, visible in FIG. 10. In a large-scale farming setup, there would be many other plant-processing machines, but they are not shown for keeping the drawing readable.

The operation of this embodiment is similar to the previous embodiment namely, the Home Roof Farming. That is, all the plants are moved to the water/nutrient dispenser 42 every time as needed. Therefore, the advantages of this embodiment is similar to Home Roof Farming System. In fact, this embodiment Generic Roof Farming system can also be implemented keeping the processing space 200 outside the building if so desired, keeping the building for some other usage.

Generic Vertical Farming

Figure 11:
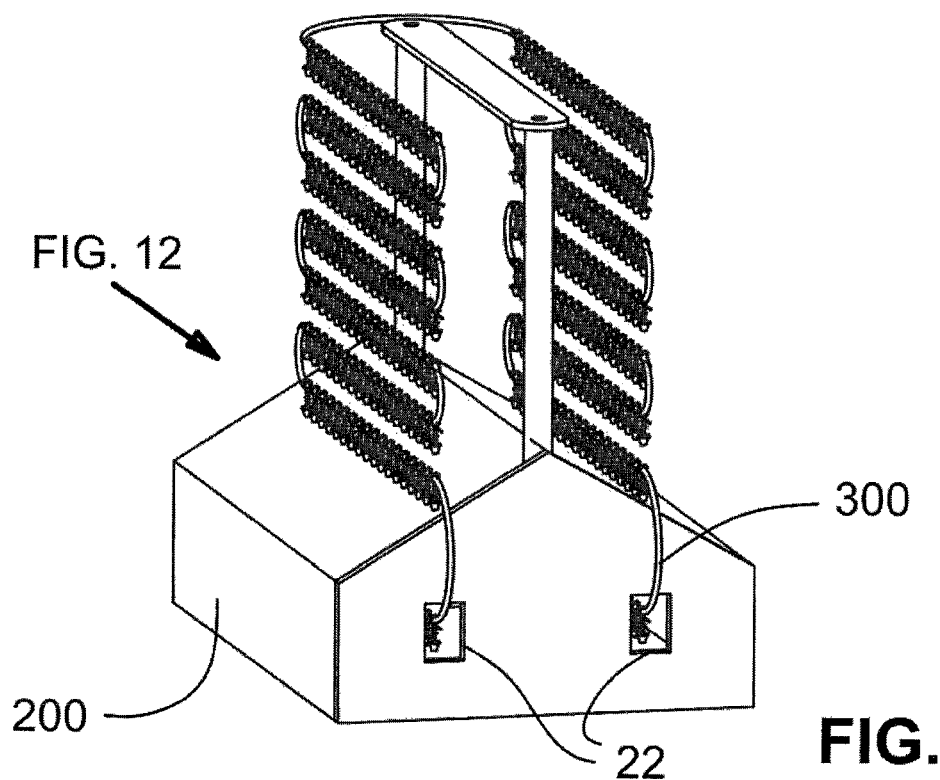
FIG. 11 & FIG. 12 show two views of a Generic Vertical Farming System.
Figure 12:
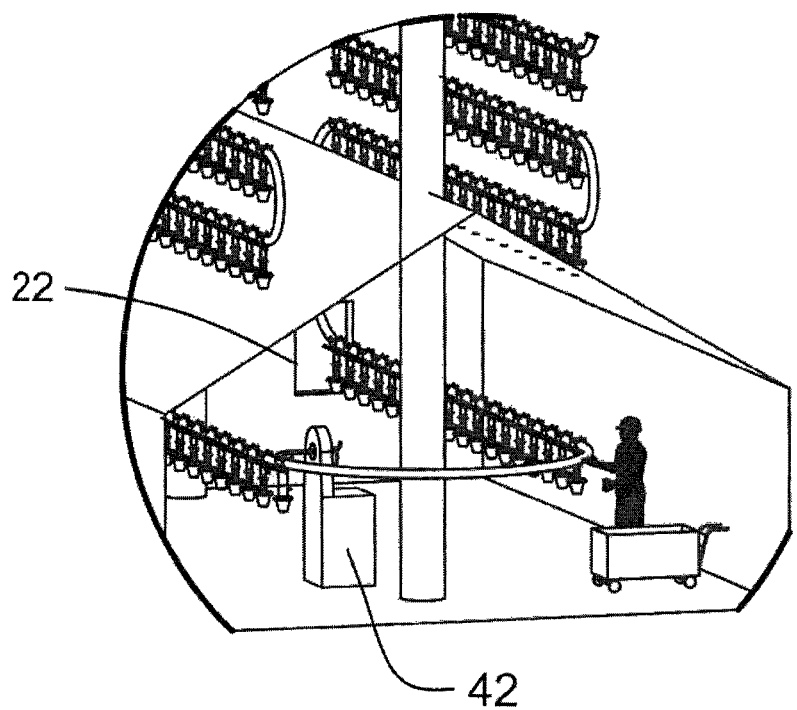

FIG. 11 and FIG. 12 schematically show the two different views of yet another embodiment of the application, a Generic Vertical Farming, where the plants move over a predominantly vertical space having natural radiation and through a central processing space 200. The central processing space is shown with the optional enclosed building with openings 22 for the conveyor rails to pass through as with the previous embodiment Generic Roof Farming System. The opening 22 would be where the optional device, an air-door/air-curtain or weather-strips (device not shown), may be setup for better atmospheric barrier. An automated water & nutrient dispenser 42 (better visible and marked in FIG. 12) and a human resource are shown. As per the current application, there is no water pipe line going all through the conveyor path 300. Similarly, there is no men or machines positioned in the radiation space above the roof along the conveyor. Further, the processing space 200 is smaller, away from the radiation space taking up only 2 of the limbs of the conveyor railings 300. As per certain embodiments, all resources would be grouped in the processing space 200 for enabling them to be provided the enclosure and atmosphere separated.

Underground Farming

Figure 13:
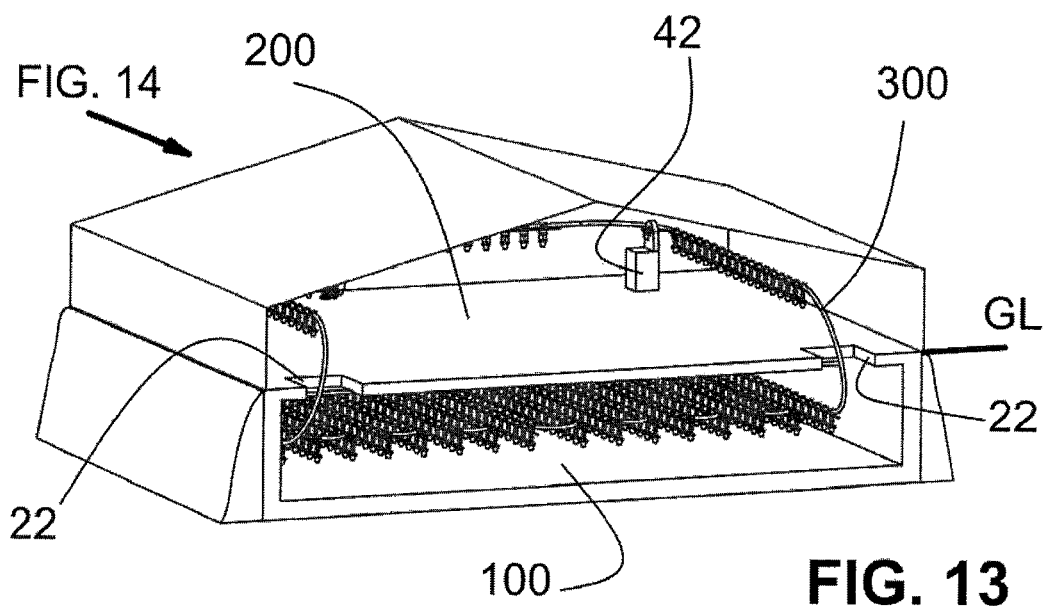
FIG. 13 & FIG. 14 show two views of an Underground Farming System.
Figure 14:
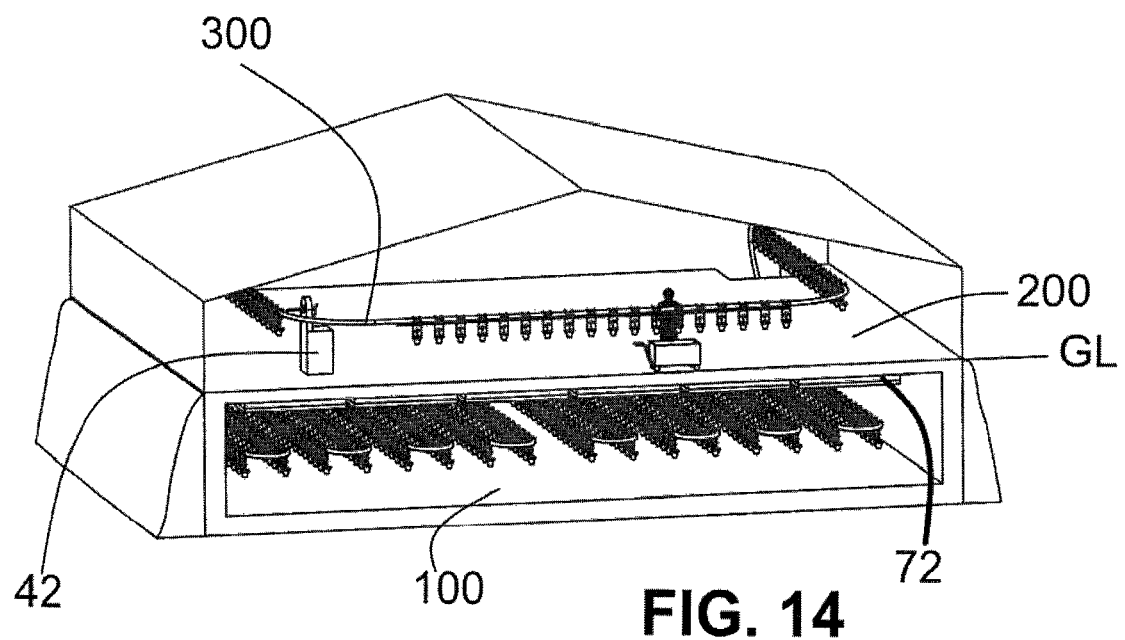

FIG. 13 and FIG. 14 schematically show two views of another embodiment of the current application, an Underground Farming System where the plants move through an underground radiation space 100 that has an array of artificial radiation lamps 72 (visible only in view FIG. 14) and through a ground level space 200 for central processing. This embodiment finds its usage in places of scarce sunlight and/or poor climatic conditions. Another application is for those plants that require extraordinary atmospheric conditions, or where special growth techniques are used that may not be possible normally.

As shown in earlier sketches, the enclosure is shown semi-transparent. The central processing is done at the ground floor above level GL in the space 200 for easy human/machine/vehicle access. Keeping the radiation space 100 underground protects the plants from outside atmosphere and saves on heating/cooling costs. Again, at the openings 22 where the conveyor path 300 passes in and out of the processing space 200, air-door/air-curtain can be implemented (device not shown) as atmospheric-barrier. Once again, the scheme works by moving the plants close to the water/nutrient dispenser 42 whenever required. As with previous schemes, there is no need for distributing water/nutrients all over the farming place.

In all the above embodiments, the central processing space 200 is shown with the minimal resources especially the of water/nutrient dispenser 42. There can be numerous other resources as said before which are not shown in the sketches for the sake of simplicity.

Lawn Automation

Figure 15:
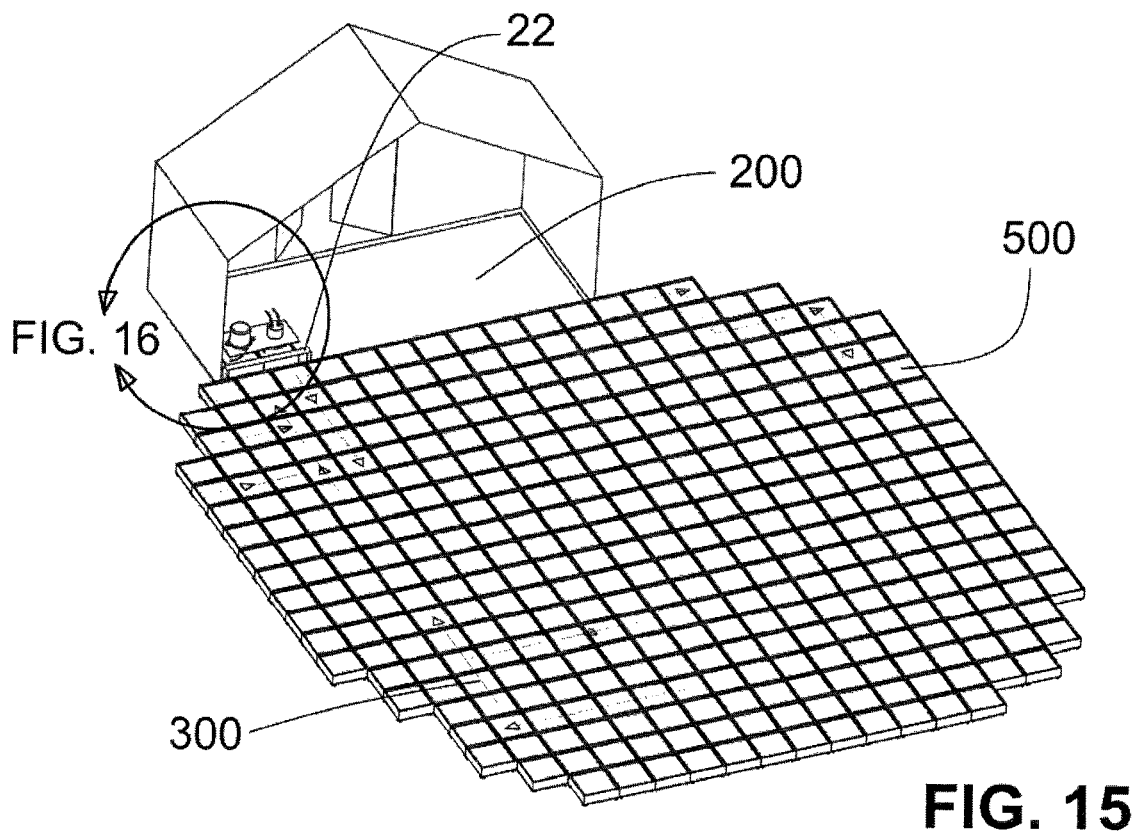
FIG. 15 & FIG. 16 show two views of an Automated Lawn Maintenance System.
Figure 16:
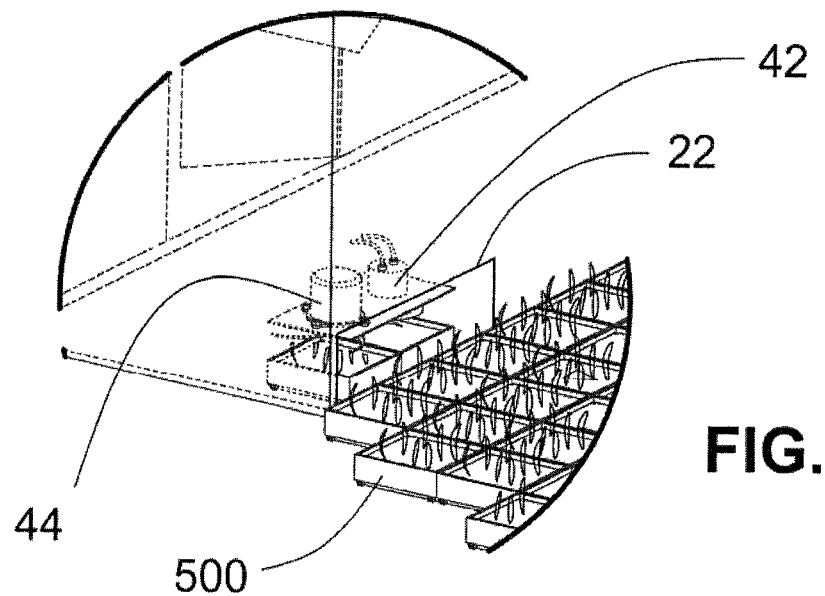

The FIG. 15 and FIG. 16 schematically illustrate the two views of another embodiment of the current application, a Lawn Automation System, where the lawn maintenance is fully automated and centrally processed. The odd-shaped lawn is divided into an array of square segments filled by an array of square trays 500 each of which serves as the plant-container. Each plant-container 500 carries an amount of soil and an array of grass grown on it. The plant-containers 500 are kept on the conveyor path 300 (only the path direction is indicated in the FIG. 15 and not the conveyor itself) which spans through the area of the lawn. Each plant-container 500 can have their drive mechanism comprising axle(s), wheel(s) and possible dedicated motor under it (drive mechanisms not shown). The open lawn space is the radiation space in this scheme.

When it is time to cut or water the grass, the conveyor is controlled such that all the plant-containers 500 with the soil & grass move one by one from the outside radiation space into a central processing space 200. The design shows the processing space 200 with the optional enclosure. The plant-containers enter and leave the processing space through an opening 22 provided in the above enclosure. In the processing space 200, each plant-containers 500 cross the space below the static grass-cutter 44 and the static water/nutrient sprinkler 42. When the cutting/watering processes are completed, the plant-containers 500 move out of the central processing space 200, back into the outside radiation space, all the time controlled by the conveyors below them.

Figure 17:
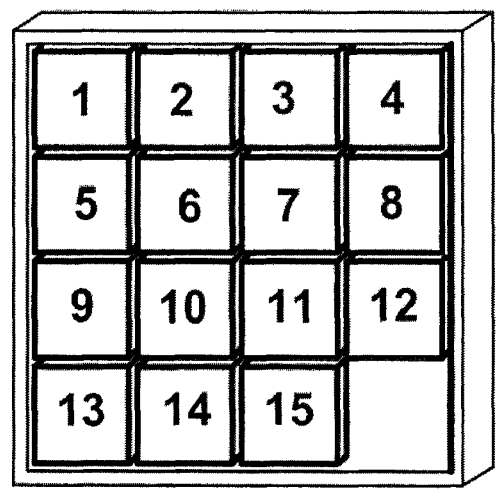
FIG. 17 shows the gaming device "15-puzzle".

The movement of the square trays/plant-containers 500 is similar to the several sliding-square-blocks games available in the market. One such example game scheme by the name "15-Puzzle" is shown in the FIG. 17. In the 15-Puzzle game scheme, the vacant square is within the game space of 16 squares becoming the $16^{th}$ square at the end of the game. In the case of Lawn Automation System described here, the vacant square is positioned outside the lawn area. It would be a vacant square initially before the processing starts and finally after the plant processes are completed for all containers 500.

The drive mechanism under each plant-container 500 guide them in 'one direction at a time', preplanned according to the optimal moving plan for that lawn. The conveyor control plan leads each plant-container 500 to the processing space 200 one by one and brings back to the radiation space 100. The requirement is that, after grass-cutting/watering, each container 500 just needs to be positioned somewhere in the radiation space again. It is not necessary for us to bring each plant-container 500 back to its exact initial location in the grid. This makes it easier to optimize the sequence of movements of the containers. The whole movement could be electronically controlled and electro-mechanically operated.

Only the scheme of the present application is shown. Several additional features can be incorporated, such as a grass clippings processing/disposal system (not shown in the FIG) at the processing space 200. Similarly, a safety fence could be implemented at the opening 22 of the processing space 200.

Any odd shaped lawn with curved boundaries can be represented by a grid of squares as shown in FIG. 15 with its boundaries approximated to a zigzag formation instead of smooth curves. In many cases, the zigzag shape itself may be aesthetically pleasing. If the lawn ground is not a level surface, the railings and the conveyor systems will correspondingly need more sophisticated mechanisms and mechanical linkages such as, flexible shafts and universal couplings. They may possibly need smaller squares in the grid to represent the lawn surface compared to a level surface lawn. Smaller square size helps to bring the zigzag boundary closer to real boundary curve. Further, the grid and the plant-container 500 can be made of rectangle, hexagon or any other suitable polygon shape as long as we can fill the surface using such grid and move them around on the conveyor.

Once again, the processing space 200 need not be enclosed for the basic implementations, but it may be a preferred addition in practice. In this case, the enclosure may serve to separate the grass clippings and reduce the noise from the machines.

The novelty of the current application, namely the centralizing of the plant processes, can be appreciated best in this Lawn Automation embodiment because of the unexpected solution it brings for the automation. If we apply any of the other automation methods used in the prior arts for the lawn automation, it would ruin the appearance of the lawn. For example, it will not be an acceptable solution for the owner of the lawn, if the automation scheme places the water/nutrient feeder and the lawn mower(s) spread over the lawn all the time.

The described lawn automation in this embodiment is even more appropriate for roof lawns and roof gardens that are difficult to climb and maintain on a daily basis.

Aquaponic Farming

Figure 18:
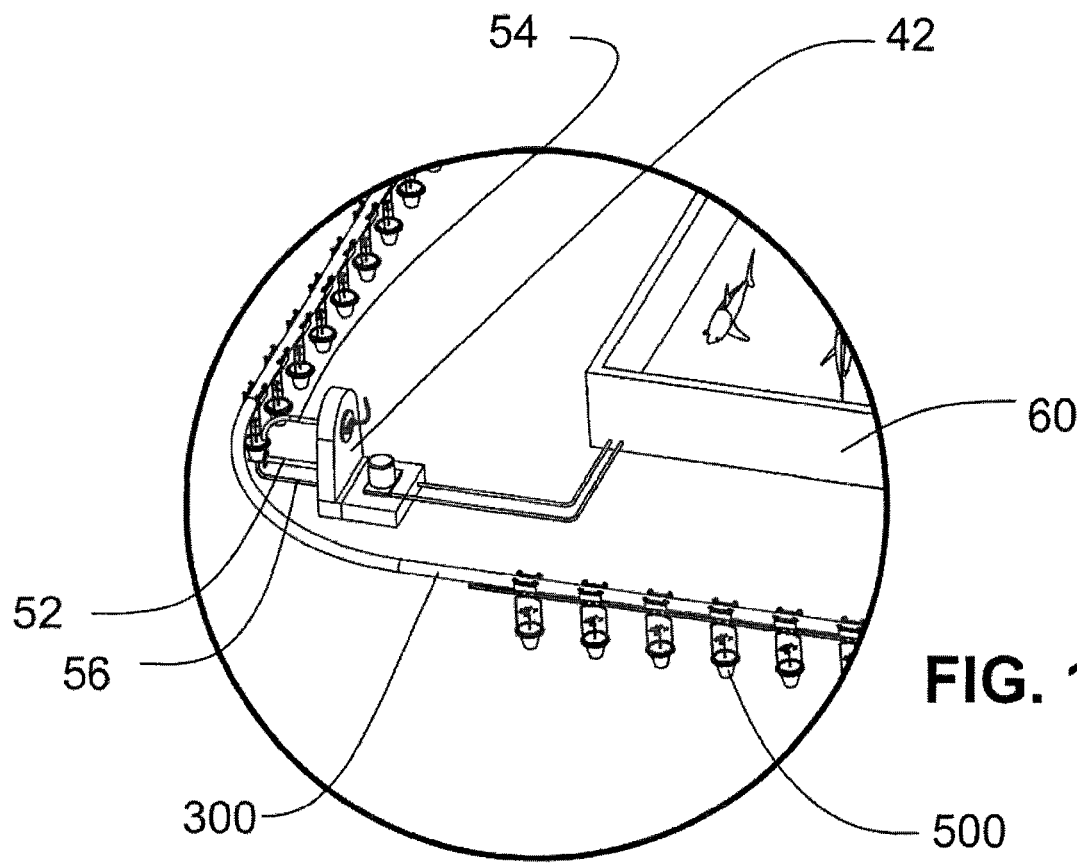
FIG. 18 shows a scheme of an implementation where aquaponic-farming technique is implemented.

FIG. 18 shows a scheme on how certain embodiments can also implement aquaponic-farming techniques. The partial view of the central processing space is shown with a portion of the conveyor rail 300 carrying the plant-containers 500. The automated water dispenser 42 feeds water brought from a fish tank 60 to the plant-container 500 via water feeding pipe 54. The drain unit 52 opens the drain valve (details not shown) of the plant-container 500; the drain water is collected and sent back to the fish tank 60 through pipe 56. The details of pump, plant-container sensor, mechanisms, etc. are not shown for simplicity. The fish tank 60 may or may not be kept in the processing space 200 since the environmental requirement for fish tank may differ. Further, the fish tank(s) can be connected by sufficiently long water pipes/hoses.

Thus, without deviating from the basic scheme of the current application, namely, the plants held on the conveyor, repeatedly move to the static resources kept close to the conveyor, various embodiments can be built.

Conveyor Frame

The implementation of the current application of FIGS. 7 & 8 can be further enhanced by providing a mechanism to move the conveyor rail 300 away from the roof surface. This allows plants to be moved and for the user to be able to do any roof maintenance work without having to entirely dismantle the conveyor assembly and without impacting the plant's life cycle.

Figure 19:
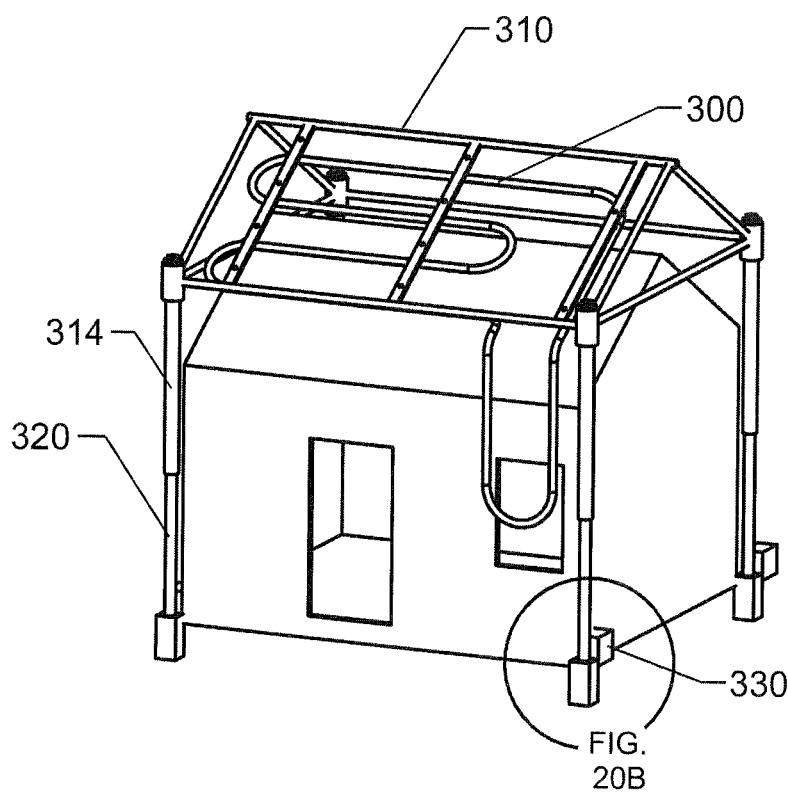
FIGS. 19 & 20A show a conveyor on a movable frame that is movable vertically up and down.
Figure 20A:
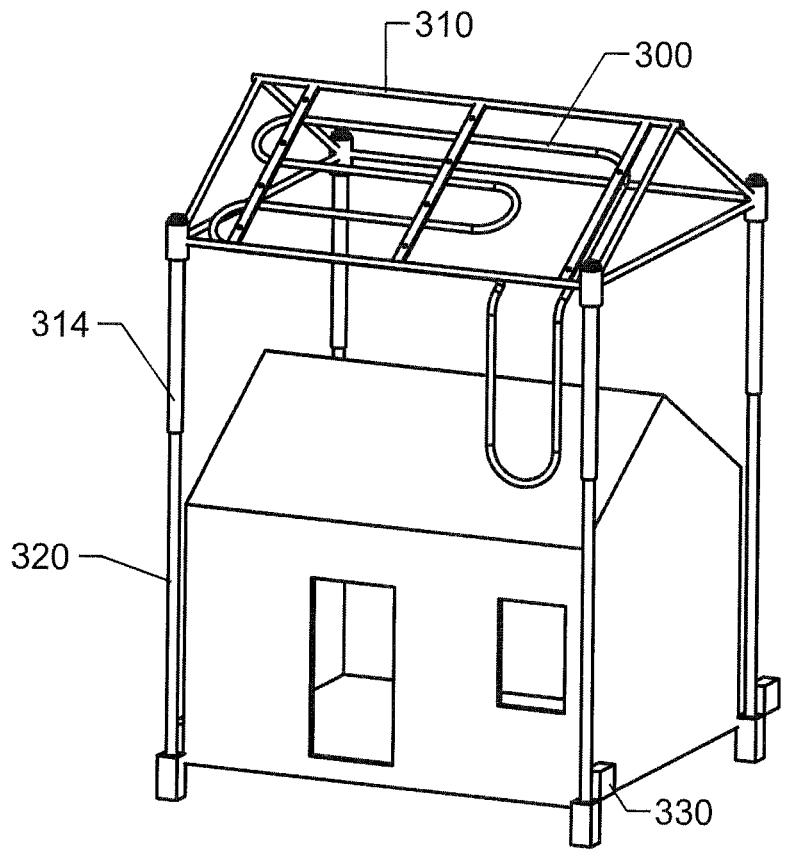

FIGS. 19 & 20A show schematically, an embodiment of the current application where the conveyor rails 300 is movable in vertical direction. The conveyor assembly with the rails 300 is mounted on a framework 310 which has a sliding member 314, each slidable on a set of pillars 320. Moving a framework up or down can be accomplished in numerous ways such as rope/pully, rack/pinion, worm gear/worm, cylinder/piston (hydraulic), or any 4-bar mechanisms. Typically, such systems are operated by an electric motor or other mechanical movement device and are further controlled by optional electronic circuits (details not shown). Manual cranking means can also be implemented as a stand-by or an alternative to the electric motor.

Figure 20B:
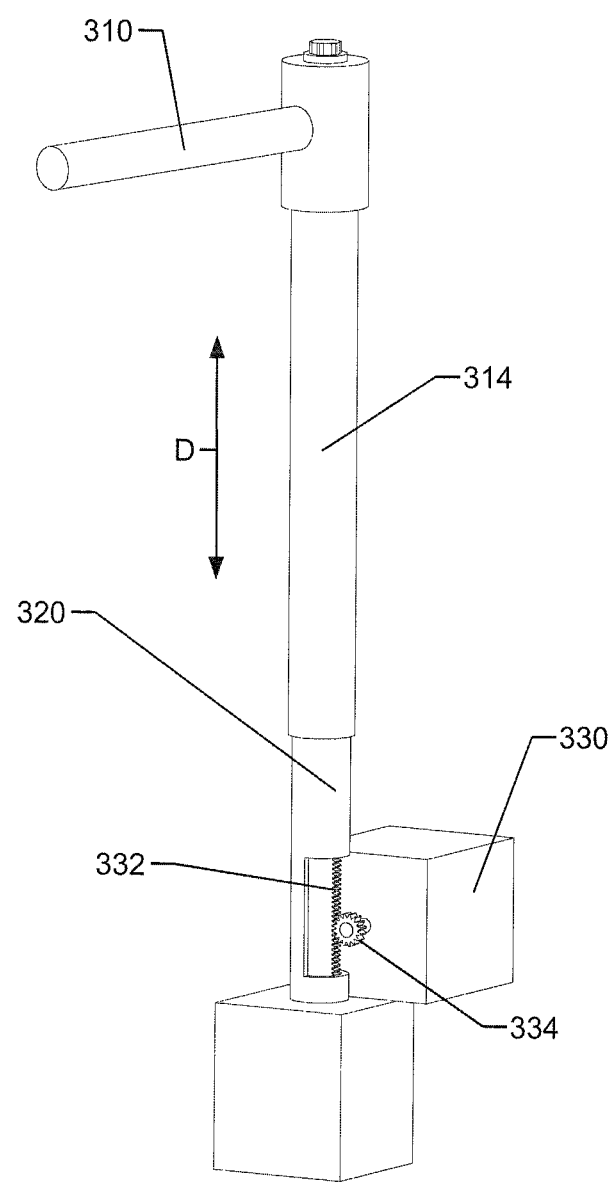
FIG. 20B shows a scheme of using Rack & Pinion for moving the conveyor off of the roof.

FIG. 20B shows a rack and pinion scheme as an example, to lift the sliding member 314, which carries the framework 310 (the full frame, fasteners, etc. details not elaborated to avoid clutter in the drawings). Direction of travel 'D' in this scheme is vertical. The rack 332 and the pinion gear 334 are schematically shown in the FIG. 20B. The drive unit 330, a motor or a manual crank drive turns the pinion gear 334 which drives the rack 332 which moves the frame 310 due to the rigid connection between the rack 332, slider 314 and the framework 310.

Although rack 332 and the pinion gear 334 are shown in the FIG. 20B, it should be appreciated that the driving mechanism 330 can have numerous design variations. For example, with the FIG. 20B rack & pinion scheme shown, used in this FIGS. 19 & 20A, four drive units 330 may each operate under each pillar 320 to maintain good load distribution and balance. In other examples, the driving mechanism 330 may include a hand crank, a hydraulic piston, etc.

When the roof maintenance work is needed, the drive unit 330 is operated and the framework 310 with the conveyor 300 is lifted upwards to clear the roof area so that people/resources can work on top of the roof to do the maintenance. FIG. 19 shows the conveyor 300 at the normal low position while FIG. 20A shows the conveyor 300 in a raised position.

In one example, the drive unit 330 may include a sensor (not shown that detects a position of the sun or other light source) and the drive unit 330 may be selectively activated based the detected location of the sun. For example, the drive unit 330 in FIGS. 19 and 20A may raise the frame by a height where that one or more sections of the conveyor are positioned to receive light from the sun. For example, the drive unit may move the frame to position the plants over a shadow produced by an adjacent tree or building.

Figure 21:
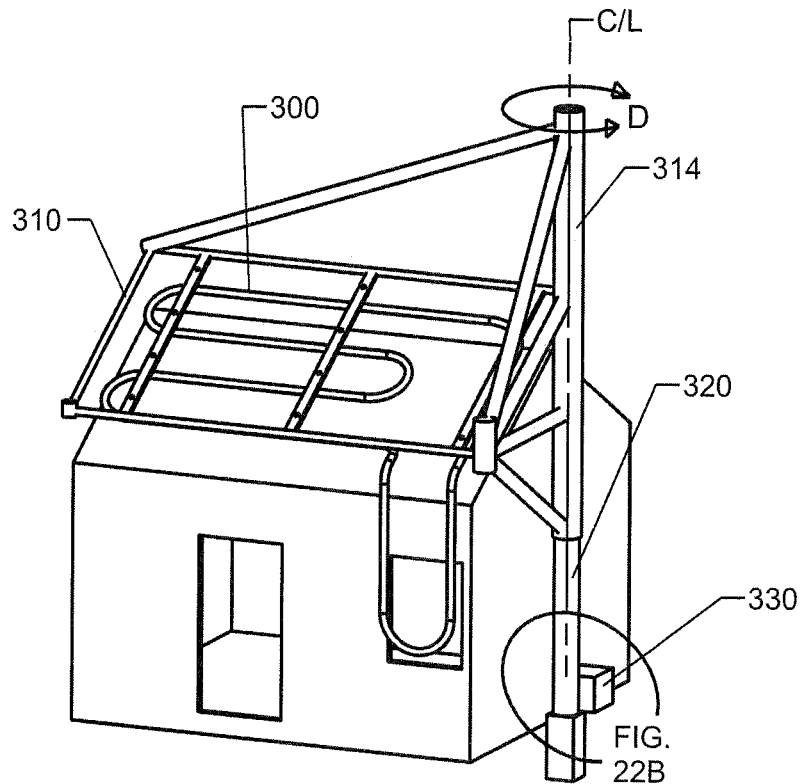
FIGS. 21 & 22A show a conveyor on a movable frame that is movable horizontally from and towards the top of roof.
Figure 22A:
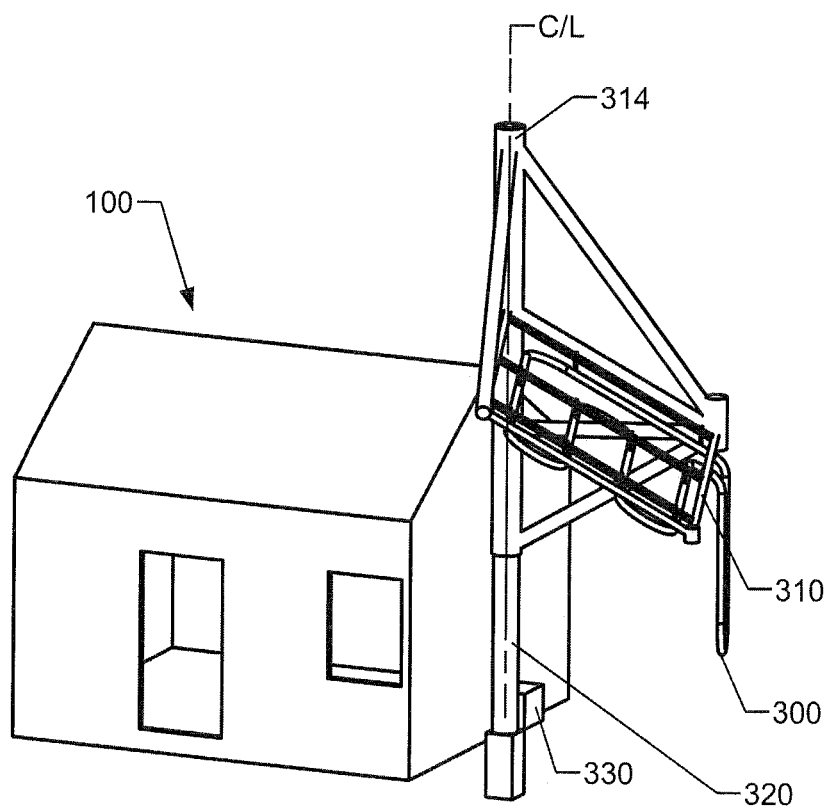

In other conditions, such as when the conveyor size is relatively smaller, an alternative design approach could be used whereby the conveyor 300 moves horizontally, and angularly as shown in FIGS. 21 & 22A. In FIGS. 21 and 22A, the framework 310 is supported by single pillar 320 on which the framework 310 is hinged with their coincidental axes shown as C/L (for Center Line). A drive unit 330 drives and moves the framework 310 with the conveyor rails 300 angularly and horizontally away from the roof surface shown as direction 'D", to aid the roof maintenance work.

Figure 22B:
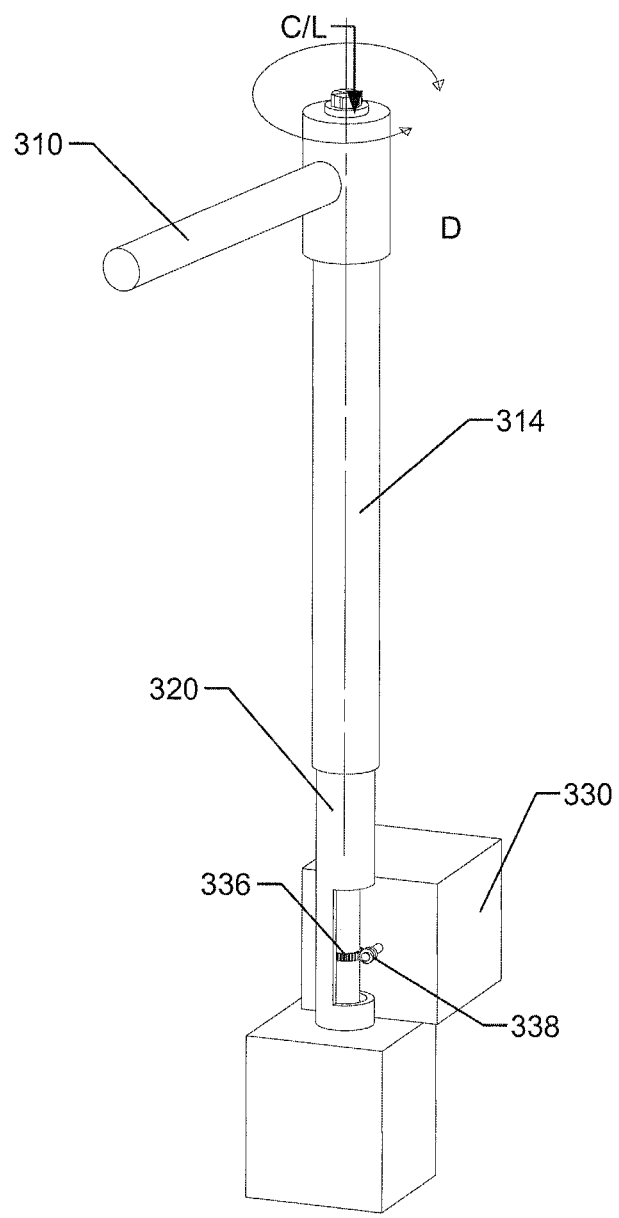
FIG. 22B shows a scheme of using Worm and Worm gear for moving the conveyor off of the roof.

Such angular displacement can be achieved by several mechanisms, one scheme being shown in FIG. 22B. FIG. 22B shows a pillar 320 having a rotationally sliding sleeve 314. A shaft passing inside the pillar 320 is mounted with a worm gear/wheel 336 which is driven by a worm 338 which in turn is driven by the drive unit 330, which could be an electric motor or a hand crank.

In one example, the drive unit 330 may include a sensor (not shown) that detects a position of the sun or other light source) and the drive unit 330 may be selectively activated based the detected location of the sun. For example, the drive unit 330 in FIGS. 21 and 22A may rotate the frame 310 to position where that one or more sections of the conveyor path 300 are positioned to receive light from the sun. For example, the drive unit may rotate the frame 330 to face the sun to minimize sections of the conveyer 300 that block sunlight from reaching other sections of the conveyer 300.

In another implementation, the drive unit 330 in FIGS. 19, 20A, 21 and 22A may both cause the frame 310 to both rise and to move horizontally. For example, the drive unit 330 may include both a pinion gear 334 to drive a rack 332 on the pillar 320 and a worm 338 to drive a worm gear/wheel 336 on the pillar 320.

The approach of the current application is taking the plants to a different place 200 for all processing, different from the harsh radiation space 100. Where exactly the processing is done is a design choice and they can be numerous.

Different Processing Spaces

Following paragraphs show how the location of processing space(s) and the corresponding conveyor paths can be numerous in design. The movable frame 310 holding the conveyor 300 is not shown in the subsequent figures to avoid clutter and since it is user's optional feature.

Figure 23:
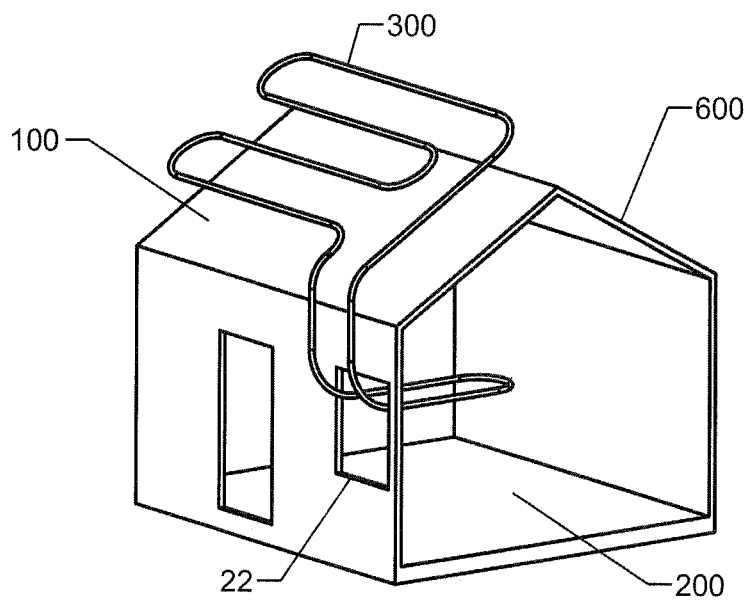
FIG. 23 shows a processing space that is positioned in a building.

FIG. 23 shows a scheme that the processing space 200 can be inside the same structure 600 whose roof is used as radiation space 100. The plants during their movement in to the building pass through an opening 22 and come back out through the same opening 22, in this example, back to the radiation space 100 on the roof of the structure 600.

The scheme shown in FIG. 23 is similar to the one shown in FIGS. 9 & 10 except that the structure is shown smaller in size to show that this can be implemented by ordinary citizens at their home or garage which is one of the goals of this application.

Figure 24:
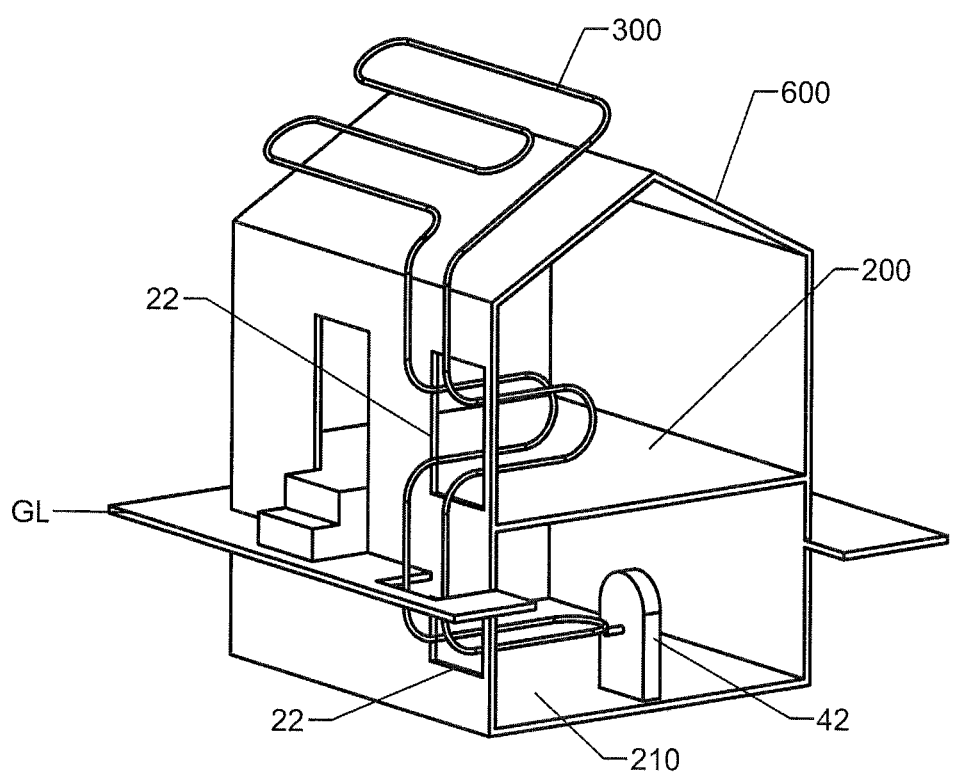
FIG. 24 show two processing spaces one at the ground and other at basement levels.

The above scheme of FIG. 23 can be further enhanced by traversing the conveyor path in to multiple levels including running them to basement, that is, below the ground level and bringing them back, as shown in FIG. 24.

In FIG. 24, the conveyor path 300 is laid from the roof, to pass in to a lower processing space 200 and then further in to the basement below the ground level GL, being a second processing space 210 in another loop, passing through another opening 22.

The advantage of such scheme as in FIG. 24 would be to do different plant processes at different environments. For example, the first lower processing space 200 can be for harvesting, inspection and pruning process involving both humans and machine resources while the basement space 210 can be for water/nutrient administration and anti-fungal radiation treatment which may be done by machines only. Thus, while both processing spaces 200 and 210 are in controlled environments away from the harsh radiation space 100, one of the processing spaces 200, can be set at human-friendly atmosphere while the machine-only processing space 210 can be set at different environmental setup more suited for machines.

As said with respect to other embodiments, once the plant process is completed, the plants are moved back to the radiation space 100 at the top of the structure 600.

Figure 25:
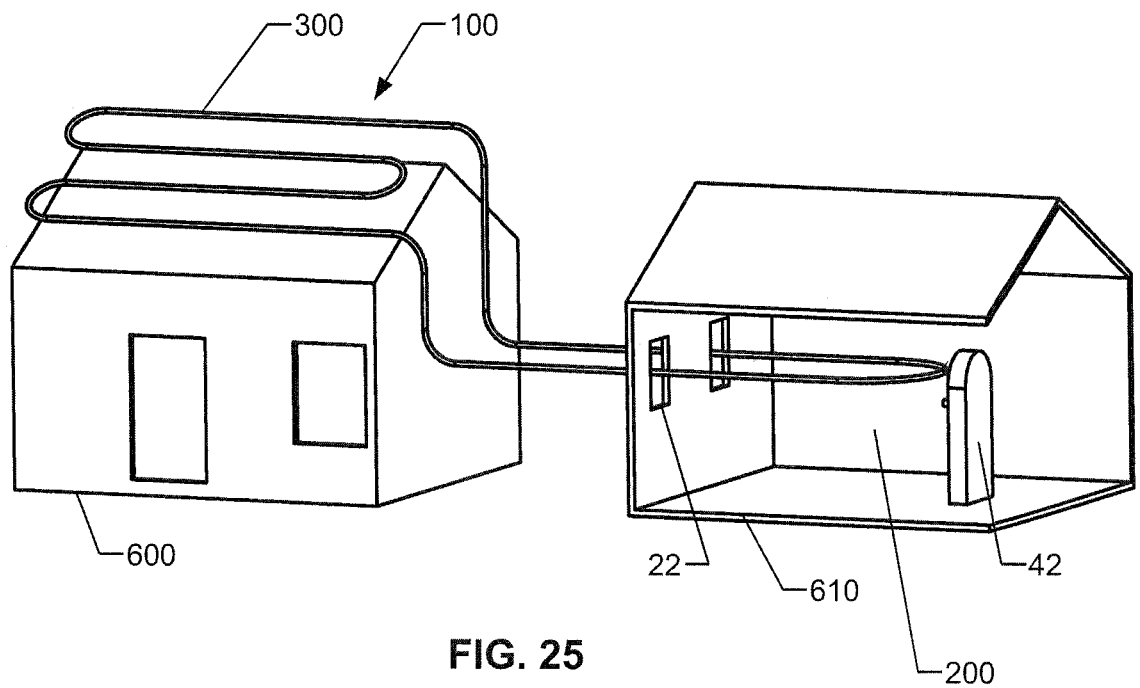
FIG. 25 shows a processing space that is positioned in another building.

Another variation of the location of the processing space could be that the processing space 200 can be in a second structure 610 outside of the first structure. FIG. 25 shows a scheme where the roof of the first structure 600 is used for radiation space 100, while the conveyor path 300 is routed to another structure 610 in which the processing space 200 is located and where the plants are processed. More such schemes could pass the conveyor path 300 in the first structure 600 as well as second structure 610 thus making the first structure 600 hold the first processing space 200 and the second structure 610 can hold the second processing space 210. The advantage of such as schemes are similar to the earlier embodiment shown in FIG. 24.

The conveyor rails 300 can be designed adjustable in linear and/or angular positions. One such design of variable length conveyor joint (limb) available in the market involves telescopic and slit tubes sliding one within the other thus varying the length of the conveyor rails. Similarly, variable angular joints for conveyor rails are common design options in the conveyor manufacturing industry. Such designs can be used to make the conveyor rails flexible especially when we move the conveyor 300 away from the radiation space 100 as shown in FIG. 19 through 22.

As already mentioned earlier in this specification, the current application is not restricted to any specific kind of plants. The location of the processing space 200, the design of conveyor path 300 and the density of plants in a given area of span, etc are decided by the kinds of plants the user wants to grow and the purpose they are used for. The idea is to simplify/automate the plant processes (including the watering) by moving the plants away from the radiation space to a resource-friendly space 200/210.

Figure 26:
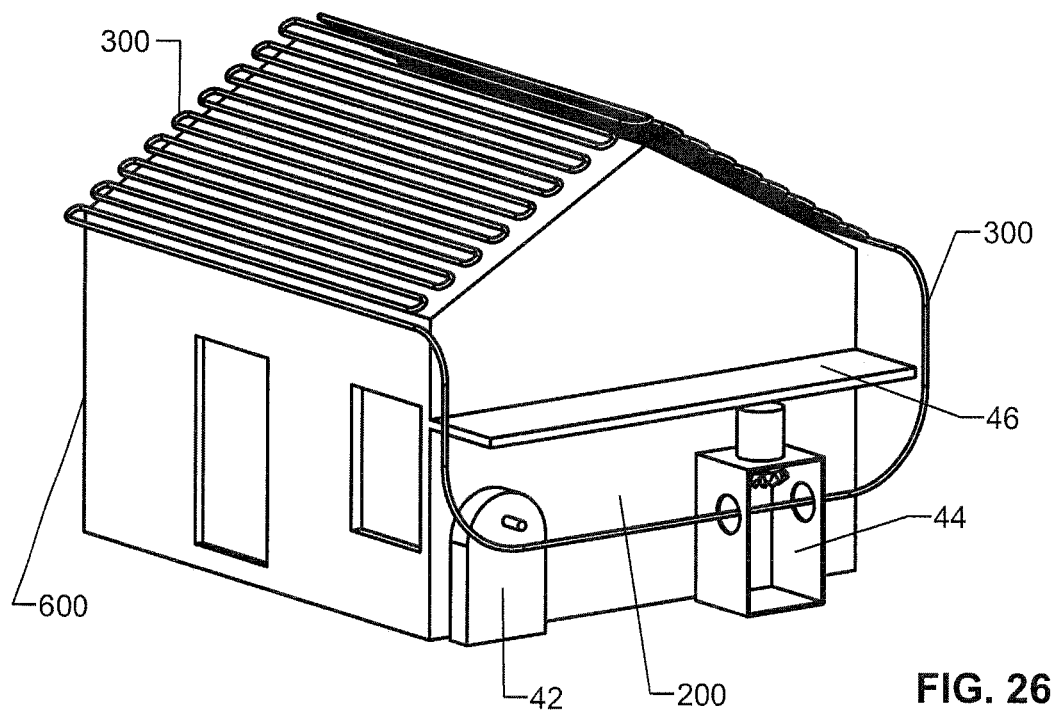
FIG. 26 shows a processing space including a watering device and a harvesting device at a side of the building.

FIG. 26 shows a scheme relates to how a user can have a closely packed set of plants on their roof and the plant processing at the side of the structure 600. The difference in this scheme to that in FIGS. 7 & 8 is that the conveyor path 300 comprises a large number of closely placed limbs of the rails 300, of the order of few inches between each of the rails 300. Such arrangement is useful for smaller plants especially decorative plants.

As with previous embodiments, the scheme of FIG. 26 automates the watering and plant cutting by placing them in a processing space 200 at the side of the structure 600. Again, the location of the processing space 200 is user's choice.

Further, the plant-containers 500 in this case of small plant can be shallower, of the order of few inches depth, for a sufficiently-watered plants' survival. Thus, this embodiment of FIG. 26 would generally comprise of smaller and lighter plant-containers 500, but closely arranged due to the closeness of the limbs of the conveyor rails 300.

Apart from giving the pride of "going green" and contributing the wellness of the Earth, the user has the choice of growing any type of fanciful and colorful plants that decorate their houses/structures as well. Furthermore, this configuration allows users to make their buildings green-top and thus give back the land to the plants acquired by the humans.

The definition of the term "Roof" is, that it is the top surface of a structure that is open to atmosphere that getting the radiation from the Sun directly. Depending on the location of the structure 600, a roof for one structure can be at floor level for another structure 610 due to their relative locations.

Figure 27:
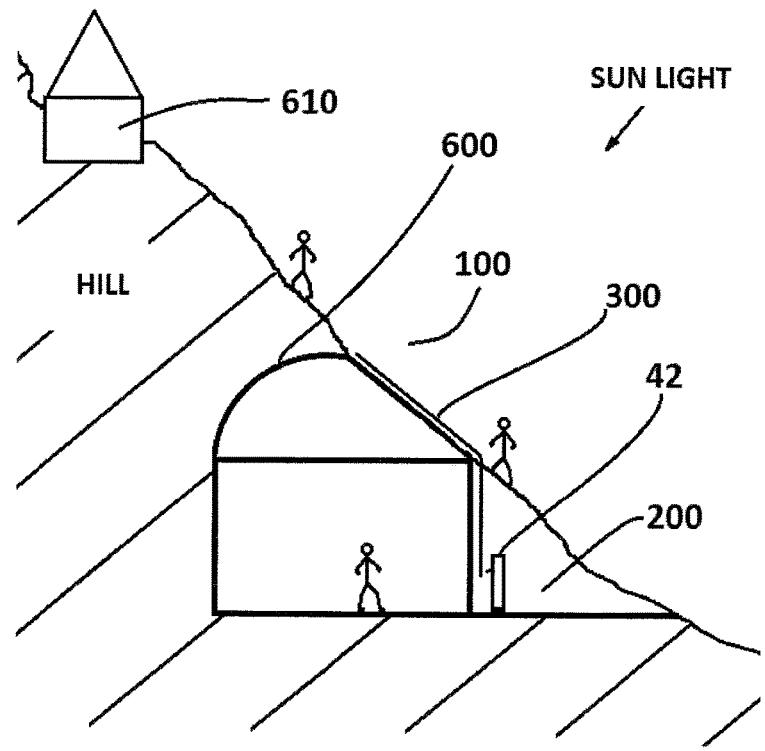
FIG. 27 shows an Earth sheltered structure on a hill side having radiation space on its roof.

FIG. 27 shows the scheme of an Earth-sheltered house 600, which is under-ground with respect to the hill slope in this example and yet uses the current application. The roof level for such houses are ground level for people outside and above. Yet the same application can be applied there as well.

In FIG. 27, what is roof for structure 600 is at floor-level for people walking on the hill. Further the same roof of the structure 600 may be referred as "basement level" by the people living on the upper slopes of the hill at the structure 610. The application is same whichever way the users may address it.

The application is about using the roof of a structure 600, the structure being a home, garage or shed or just any structural building of any nature.

Thus, the top surface of a structure laid on or near or below the ground-level, receiving Sun light directly is a roof for that structure but can be at floor level for another structure nearby. As long as the radiation space on top of a structure that directly gets Sun light, it is the roof of that structure. And if the plants are moved away from such radiation space to a processing space not receiving the Sun light, and where even watering process is executed, and the plants come back to the radiation space after processing, the current application is in effect.

Figure 28:
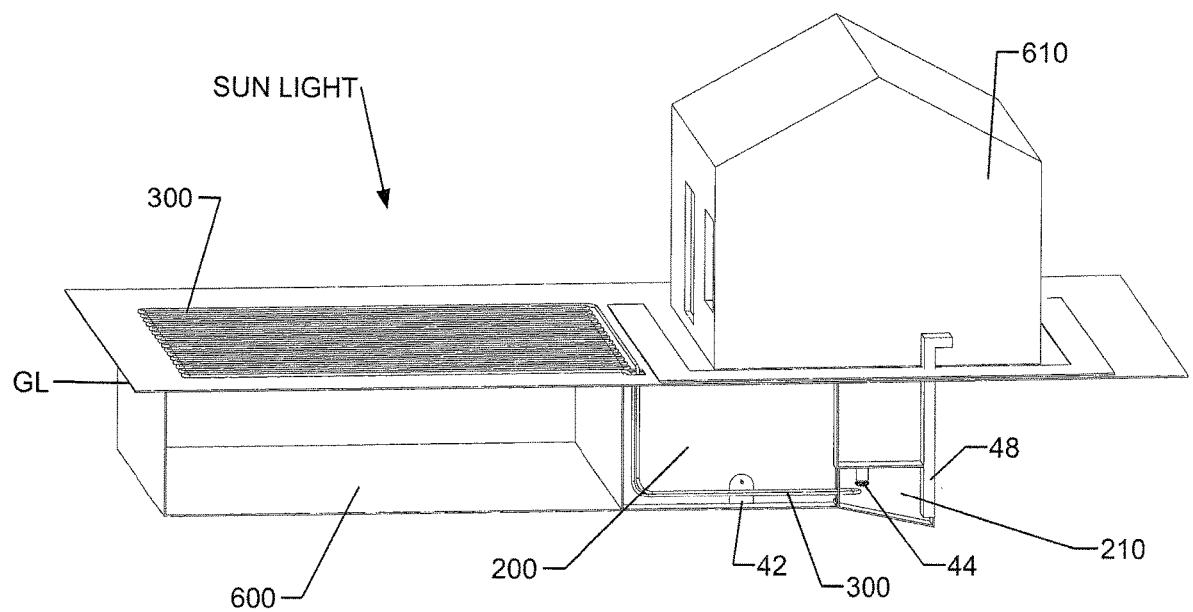
FIG. 28 shows an Earth sheltered structure on the ground having the radiation space on its roof.

FIG. 28 shows such a radiation space 100 built on a structure 600 built on or near ground level. The roof of the structure 600, in FIG. 28, is at near floor level relative to the nearby building 610.

The criteria to be met in the current application are: (a) the radiation space 100 is located on the roof of the structure that receives the Sun light directly (hence the word roof), (b) all the plants are held on a conveyor path 300 via suitable plant-containers, (c) the plant containers are moved away from the radiation space 100 to a processing space 200 for watering and other plant-processes and (d) the plant containers are brought back to the radiation space 100 after the watering/other processes.

In FIG. 28, the conveyor 300 is laid on top of a rigid structure/framework 600 near the ground and the conveyor path 300 further passes down its level to a processing space 200 below the ground level GL even for watering and mowing.

The processing space 200 below the ground level in this example, has a water/nutrient dispenser 42 and a cutter 44. Optional additional resources could be a clippings discharger 48 that removes the collected plant clippings from below the ground to outside possibly using a dedicated screw conveyor (not shown). Such system has list of advantages in that they are air-pollution free, noise-pollution free and fully automated lawn maintenance.

ADDITIONAL FEATURES IN THE EMBODIMENTS

There are numerous possibilities on how the current application may be enhanced without deviating from the basic scheme of the application. The usage of building enclosures to separate the radiation space 100 and the processing space 200 have already been shown. Similarly, the usage of atmospheric barriers have been mentioned. Some more examples are stated below which the author believes that, the experts in the respective engineering fields would be able to design easily and implement.

For example, the plant-container 500 in most sketches is shown like a simple pot whereas in actual implementation, it can be an optimal lightweight design made of plastic. It can have inlet and outlet passages with quick release valves with provisions for robotic access.

Similarly, if the plant-container 500 contains predominantly only the nutrient water, instead of soil, it would also implement the hydroponic technique.

Further, the plant-container 500 may carry little to zero water and robotic mechanisms can spray oxygenated nutrient-water into the root section of the plant container to effect aeroponics techniques.

In addition, the plant-containers 500 may be equipped with electronic identification tags such as magnetic or optic or radio frequency identification strips (RFID). The corresponding electronic readers positioned in the processing space 200 can send the information to the computer processor to decide on the plant processes to be performed for each plant/plant-container 500. This enables the robots to administer the water, nutrients, chemicals etc. by the exact quantity at right intervals, plant-container by plant-container. This enhancement thus enables multiple types of plants or same plants of different ages to be grown and harvested in the same conveyor. This benefit could not be realized in any of the prior arts.

In the current specification, the figures do not show any of the radiation space 100 to be a greenhouse, whereas, in practice this application does not hinder the usage of greenhouses. In fact, the current application helps reduce the size of the greenhouse because only the radiation space needs to be covered by greenhouse building enclosure and not the resources. In the prior arts we have seen, the greenhouse also accommodates the plant processing resources inside and hence would need to be built bigger.

Advantages

Following are the partial list of advantages of the current application not in any particular order of preference:

a) In the older methods where the farm does not employ conveyor approach, the list of objects that move towards and away from all the plants are men, machines, water, fertilizers, air, pesticides, power supply equipment, etc. This application eliminates all such movements and essentially moves only the plants.

b) Central plant processing results in efficient cultivation and reduced number of resources. Aids total automation designs. Plant-cultivation is made easier since the resources would be static. Hence helps family-run small farms. Because the resources are separated and centralized, it is easy to set men & machines in air-conditioned/warmed buildings where the plants will visit them. Further, it minimizes build cost as it avoids multiple sets of same machines.

c) Reduces the land required for a given amount of farm produce. Carries the same advantages as of horizontal, vertical and roof farming. Thus, helps urban farming.

d) Because of total automation, controlled cultivation of multiple plant types is accomplished.

e) When plants are processed one by one in a central place, infected plants can be easily identified and treated/removed from the conveyor thus avoiding spread of plant diseases. This results in less pesticide or zero pesticides used.

f) The application is easily adaptable for wide range of farm sizes.

g) Reduces greenhouse size.

h) Reduces cost and energy spent on the in-farm transit of farm materials.

i) Roof farming, saves energy consumption by the buildings/houses. This also reduces the transport of the produce brought into the city and saves on resources and fossil fuel usage.
j) Enables lawn automation. Reduces noise pollution. There would be significant reduction in the gasoline consumption by the homeowners. The mowers, the water hoses and sprinklers would no longer be needed. Water will be saved by economical usage, because the grass according to the current application would be kept on trays that could hold water longer than ground. The mulch generated due to the grass-clippings can be easily packed and used efficiently for other purposes. Hence, this implementation results in cleaner lawn and hence cleaner cities/earth.
k) The application supports newer technologies in farming methods such as greenhouse, hydroponic, aquaponic, aeroponics, etc.
l) Easier administration of insects for pollination purposes, because of separation of radiation space and the processing space. The insect handling can be done without hurting humans or machines. Further, it would be easier to cover a select number of plants with nets/wire mesh saving them from birds & insects.
m) This application is also useful in the places that do not have cultivable land. The nutrient water and the ingredients can be administered using one stationary machine in the central processing space, using hydroponic techniques.

CONCLUSION

It is humbly submitted that the sketches in this specification show only the schemes of the essential elements of the application and do not represent the exact design, shape, size, scale or quantities of the elements.

For clarity of the sketches, at least the following simplifications have been done:
a) Just one plant is shown per plant-container 500 except the Lawn Automation Scheme, whereas it can be an array of plants per container depending on the plant, plant-container size and the convenience of handling.
b) The plant-container is shown to be a simple pot, whereas it can be any material/design to accommodate the plants with a variety of ingredients and with features to aid the automation. The plant-containers are shown at exaggerated distances.
c) The conveyor and its mechanisms are not shown. The structural supports for the conveyor rails 300 or other frames are not shown.
d) Most resources for common plant processes such as pruning, pesticide administration, etc. are not shown. Devices for air-conditioning or heating or humidity controls or wind-door etc. are not shown.
e) The enclosures are shown transparent/semi-transparent for showing the elements inside and for easy visualization of the absence of the enclosure.

The author believes that the matter in this specification is sufficient to convey the scheme of the application and the various example implementations of the same. Design of plant-containers, conveyors, robots, etc., are specialized fields with numerous possibilities and hence are not elaborated in this specification. It is submitted that the specialists in those fields can understand and appreciate what is submitted here for implementing the same in their design.

It is also humbly submitted that to the knowledge of the author, none of the prior arts are found to have the combination of the novelties, advantages and problem-resolutions as envisaged in this application.

It is appreciated that numerous design variations to the current application are possible to those skilled in the art without departing from the spirit and scope of the application.

What is claimed is:

1. A horticulture method to grow plants, the method comprising:
    positioning the plants in a plurality of containers supported by a conveyor, the conveyor having a path defined by a set of conveyor rails;
    laying the conveyor rails to pass into a radiation space above a roof of a structure, and into a processing space that is different from the radiation space;
    providing water pipelines and a dispenser in the processing space; and
    moving, by the conveyor, the plants between the radiation space and the processing space during the plants' lives, wherein moving the plants by the conveyor includes:
        positioning the plants in the radiation space during first portions of the plants' lives;
        moving, by the conveyor, the plants in the processing space during second portions of the plants' lives; and
        returning the plants from the processing space and back to the radiation space after the second portions of the plants' lives,
    wherein one or more of the conveyor rails are supported by a frame that extends above at least a portion of the roof of the structure and further comprising an additional mechanism to displace one or more of the conveyor rails with the frame away from the roof surface.

2. The horticulture method of claim 1, wherein the dispenser further administers nutrients for the plants.

3. The horticulture method of claim 1, wherein the processing space is a first processing space, and the conveyor rails further pass into a second processing space that is separate from the first processing space and the radiation space, and at least one of another dispenser or a harvester is located within the second processing space, and
    wherein moving the plants by the conveyor further includes moving the containers between the second processing space and at least one of the radiation space or the first processing space.

4. The horticulture method of claim 1, wherein at least a portion of the processing space is located within an enclosure, and the enclosure further includes one or more openings through which the conveyor extends to move the containers into or out of the enclosure.

5. The horticulture method of claim 4, wherein an atmospheric-barrier is provided in at least one of the one or more openings.

6. The horticulture method of claim 4, wherein the enclosure is provided within the structure.

7. The horticulture method of claim 1, wherein one or more of the conveyor rails extends below ground level.

8. The horticulture method of claim 1, wherein the dispenser is provided at a user-accessible height.

9. The horticulture method of claim 1, wherein the conveyer rails are positioned to form a closed loop through the processing space and the radiation space.

10. The horticulture method of claim 1, wherein the conveyer is configured to move the containers based on manual cranking by a user.

11. The horticulture method of claim 1, wherein a first quantity of the containers is positioned in the radiation space and a second quantity of the containers is positioned in the processing space at a time.

12. The horticulture method of claim 1, wherein a cutter is located within the processing space, and wherein the cutter trims the plants in one or more container in the processing space.

13. The horticulture method of claim 1, wherein the containers hang from the conveyor.

14. The horticulture method of claim 1, wherein the dispenser provides oxygenated water to root sections of the plants.

15. The horticulture method of claim 1, wherein one or more of the containers include electronic identification tags, and the dispenser identifies the one or more of the containers based on electronic identification tags and provides respective quantities of water to the one or more of the containers based on identifying the containers.

16. The horticulture method of claim 1, wherein:
the processing space is provided at an enclosure that is outside of the structure,
the structure is a first structure, and
the enclosure is included in a second structure that differs from the first structure.

17. The horticulture method of claim 1, wherein:
the processing space is provided at an enclosure that is outside of the structure,
the structure is a first structure, and
the enclosure is below a ground level of a second structure that differs from the first structure.

18. The horticulture method of claim 1, wherein said additional mechanism vertically moves a portion of the frame to change the height of the one or more of the conveyor rails supported by the frame.

19. The horticulture method of claim 1, wherein said additional mechanism horizontally moves a portion of the frame to change the horizontal location of the one or more of the conveyor rails supported by the frame.

20. The horticulture method of claim 1, wherein said additional mechanism moves the portion of the frame in both vertical and horizontal directions.

21. A horticulture method to grow plants, the method comprising:
positioning the plants in a plurality of containers supported by a conveyor, the conveyor having a path defined by a set of conveyor rails;
laying the conveyor rails to pass into a radiation space above a roof of a structure, and into a processing space that is different from the radiation space;
providing water pipelines and a dispenser in the processing space; and
moving, by the conveyor, the plants between the radiation space and the processing space during the plants' lives, wherein moving the plants by the conveyor includes:
positioning the plants in the radiation space during first portions of the plants' lives;
moving, by the conveyor, the plants in the processing space during second portions of the plants' lives; and
returning the plants from the processing space and back to the radiation space after the second portions of the plants' lives,
wherein one or more of the conveyor rails are supported by a frame that extends above at least a portion of the roof of the structure, and
wherein the conveyer includes two or more rows that are positioned at respective different heights on the roof of the structure, and the two or more rows are positioned by the frame over respective sections of the roof.

22. The horticulture method of claim 21, wherein:
the processing space is provided at an enclosure that is outside of the structure,
the structure is a first structure, and
the enclosure is included in a second structure that differs from the first structure.

23. The horticulture method of claim 21, wherein:
the processing space is provided at an enclosure that is outside of the structure,
the structure is a first structure, and
the enclosure is below a ground level of a second structure that differs from the first structure.

24. A horticulture method to grow plants, the method comprising:
positioning the plants in a plurality of containers supported by a conveyor, the conveyor having a path defined by a set of conveyor rails;
laying the conveyor rails to pass into a radiation space above a roof of a structure, and into a processing space that is different from the radiation space;
providing water pipelines and a dispenser in the processing space; and
moving, by the conveyor, the plants between the radiation space and the processing space during the plants' lives, wherein moving the plants by the conveyor includes:
positioning the plants in the radiation space during first portions of the plants' lives;
moving, by the conveyor, the plants in the processing space during second portions of the plants' lives; and
returning the plants from the processing space and back to the radiation space after the second portions of the plants' lives,
wherein one or more of the conveyor rails are supported by a frame that extends above at least a portion of the roof of the structure, and
wherein the conveyer includes two or more rows that are positioned at respective different heights on the roof of the structure, and the two or more rows are positioned by the frame over a common section of the roof.

25. The horticulture method of claim 24, wherein:
the processing space is provided at an enclosure that is outside of the structure,
the structure is a first structure, and
the enclosure is included in a second structure that differs from the first structure.

26. The horticulture method of claim 24, wherein:
the processing space is provided at an enclosure that is outside of the structure,
the structure is a first structure, and
the enclosure is below a ground level of a second structure that differs from the first structure.

\* \* \* \* \*